(12) United States Patent
Rose

(10) Patent No.: US 8,566,725 B2
(45) Date of Patent: *Oct. 22, 2013

(54) AUDIENCE PLATFORM

(71) Applicant: LinkedIn Corporation, Mountain View, CA (US)

(72) Inventor: R. Kevin Rose, San Francisco, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/785,217

(22) Filed: Mar. 5, 2013

(65) Prior Publication Data

US 2013/0185629 A1 Jul. 18, 2013

Related U.S. Application Data

(63) Continuation of application No. 12/543,503, filed on Aug. 18, 2009, now Pat. No. 8,402,374.

(60) Provisional application No. 61/182,745, filed on May 31, 2009.

(51) Int. Cl.
*G06F 3/00* (2006.01)

(52) U.S. Cl.
USPC ............ 715/733; 715/765; 715/810; 715/864

(58) Field of Classification Search
USPC ......... 715/716, 719, 733, 764, 765, 810, 864; 345/169; 705/7.32
See application file for complete search history.

(56) References Cited

U.S. PATENT DOCUMENTS

| | | | |
|---|---|---|---|
| 2002/0029162 A1* | 3/2002 | Mascarenhas | 705/10 |
| 2002/0178448 A1* | 11/2002 | Te Kiefte et al. | 725/46 |
| 2008/0032787 A1* | 2/2008 | Low et al. | 463/29 |
| 2008/0065469 A1* | 3/2008 | Specter et al. | 705/10 |
| 2009/0210246 A1* | 8/2009 | Patel et al. | 705/1 |
| 2009/0254541 A1* | 10/2009 | Kolawa et al. | 707/5 |
| 2009/0307168 A1* | 12/2009 | Bockius et al. | 706/46 |

\* cited by examiner

*Primary Examiner* — Xiomar L Bautista
(74) *Attorney, Agent, or Firm* — Park, Vaughan, Fleming & Dowler, LLP

(57) ABSTRACT

An audience platform is disclosed. In a first example case, a first question is received. A preference event associated with the first question is received. A score is determined for the first question based at least in part on the preference. In a second example case, indications of a first and second potential interviewee are received. Preference events associated with the first and second potential interviewees are received. Scores are determined for the first and second potential interviewees based at least in part on the received preference events. A designated interviewee is selected based on the first and second scores. In a third example case, indications of a first and second potential awardee are received. Preference events associated with the first and second potential awardee are received. Scores are determined for the first and second potential awardees based at least in part on the received preference events.

35 Claims, 35 Drawing Sheets digg

Alice
- ☒ Profile + History
- ▼ Messages (2 New)
- ⊞ Submit a New Story

Digg Topics
- View All ★
- Technology ▼
- World News ▼
- Entertainment ▼
- Sports ▼
- Add or Remove Topics Recent Activity by Friends
- Stories Dugg 12
- Upcoming Stories 4
- Agreed On 2
- Commented On 16
- Stories Submitted 2
- Add or Remove Friends Digging Tools
- Spy – Watch in Real Time
- Swarm View
- ...

Technology | Promoted Stories | Upcoming Stories (145)

Record Set for Hottest Temperature on Earth: 3.6 Billion Degrees in Lab
237 diggs | digg it
submitted by David 7 hours 26 minutes ago (via http://news.acme.com/s/space/...)
Scientists have produced superheated gas exceeding temperatures of 2 billion degrees Kelvin, or 3.6 billion degrees Fahrenheit. More...
45 Comments Topic: Science [Problem?] ✉

An Algorithm to Solve All Sudoku Puzzles
100 diggs | dugg!
submitted by Eve 7 hours 20 minutes ago (via http://www.sudokunews.com/...)
A scientist working on an algorithm to help develop images for microscopy accidentally found a universal solution to the Japanese brainteaser. More...
21 Comments Topic: Math [Problem?] ✉

Hot Temperature Achieved in Lab
250 diggs | buried
submitted by Charlie 2 hours 22 minutes ago (via http://news.wire.com/hot/...)
Some scientists got some superheated gas really really hot today. More...
5 Comments Topic: Science [Duplicate]

Robot Beats Monkey at Chess
326 diggs | digg it
submitted by David 1 hour 23 minutes ago (via http://robotica.ca/monkeychess.html)
In the first ever monkey-robot chess match, held today in Toronto, the monkey lost in only 22 minutes. More...
435 Comments Topic: Robots [Problem?] ✉

502ᵧ ⸝514
518ᵧ 8 Comments: 3 by Friends
| sort by date (-4 diggs or higher) ▼ |                                    Turn Profanity Filter On 504 ⸝ | 🖼 by Bob 21 hours ago  | ⊘ |‖‖‖‖‖‖‖‖‖‖‖‖‖‖‖‖‖‖‖‖‖‖‖| + 18 diggs 🔲🔳 | ⸜ 520
One thing the article didn't mention is just how expensive it is to build one of these. I'd estimate the cost at $100 if you buy the parts at garage sales.
                                                                                                 [reply]
        | 🖼 by Legolas 3 hours ago  | ⊘ |                                     - 1 digg 🔲🔳 |
                                         ⸜524
510 ⸝   Bob rul3z! Come play poker on my website!

506 ⸝ | 🖼 by David 20 hours ago | ⊘ |‖‖‖‖‖‖‖‖‖‖‖‖‖‖‖‖‖‖‖‖☆ Bob + 14 diggs 🔲🔳 |
Something else to consider is that the project will take a lot of space and make a lot of noise/dust. If you don't have a workshop, you probably want to make sure your neighbors are out of town. :)
                                                                                                 [reply]
     | 🖼 by Leonardo 19 hours ago | ⊘ |                                    + 4 diggs 🔲🔳 |
This was on the front page over a week ago. Dupe! http://digg.com/design/Build_Your_Own_Microwave
                                                                                                 [reply]
     | 🖼 by TomTom 18 hours ago | ⊘ |                                      + 2 diggs 🔲🔳 |
I can't believe someone did this!
                                                                                                 [reply]

508 ⸝ | 🖼 by CharlieB 10 hours ago | ⊘ |‖‖‖‖‖‖‖‖‖‖‖‖‖‖‖‖☆ Bob + 11 diggs 🔲🔳 |
Ok, I tried it out. Here are some pictures I took: http://www.charlieb.com/pix/microwave. As you can see, it didn't work very well.
                                                                                                 [reply]
516 ⸜ | 🖼 by shawnharvey 19 hours ago | ⊘ |⋯[below viewing threshold, show comment] -75 diggs 🔲🔳 |
                                                   522 ⸜
510 ⸝ | 🖼 by tomlee 7 hours ago | ⊘ |                                       - 2 diggs 🔲🔳 |
Dood!
                                                                                                 [reply] ⸜ 526

Add Your Comment
| 🧑 by Alice (HTML tags aren't allowed. Comments are editable for 3 min.) |
|                                                                              |
|                                                                              |
|                                                                              |
|                                                             ⸜528             |
| [ Check Spelling ] [ Submit Comment ]                                        |

┌─1200
Café Le French

| 15 diggs | 🏠 submitted by David 7 hours 26 minutes ago (via http://www.cafelefrench.com/menu) |
| --- | --- |
| digg it | Delicious tasting menu changes weekly. Menu focuses on seasonal ingredients. Can be very crowded at lunch. More... |

1202─╯ Cuisine: French Bistro
TAGS: souflée                                                    1204─╮
Location: California >> San Francisco >> South of Market
💬 21 Comments  Problem? ▾ digg

Alice
- Profile + History — 1302
- Messages (2 New) — 1304
- Submit New Product

Digg Products
- View All — *
- Beauty / Health — ▽
- Electronics — ▽
- Entertainment — ▽
- Housewares — ▽
- Add or Remove Categories — 1306

Friends in 48 Hours
- Products Dugg — 12
- Upcoming Stuff — 4
- Agreed On — 2
- Commented On — 16
- Products Submitted — 2
- Add Friends

Digging Tools
- Spy – Watch in Real Time

---

All Digg | Alice's Diggs | Alice's Friends' Diggs — 1310, 1312, 1314 search — 1308 | ⊙ | Sign Out

Profile + Settings | History | Manage Friends | Friends History — 1316

My Profile

Products in All Categories (20) ▽ | Dugg | Upcoming | Agreed On | Submitted | Commented On | (Hide this Help) — 1320, 1322

[?] What Does "Agreed On" Mean?
Your "Agreed On" section shows products and services that at least two of your friends dugg.

268 diggs | dugg it — 1324
ACME MP3 Player Model F242
⊙ submitted by MikeT 10 hours 21 minutes ago (via http://www.eurekalert.org/pub_...)
The waterproof F242 from ACME is a great deal. Plays .ogg and .mp3 files.
Price: $199.95
💬 32 Comments | blog this | email this | category: electronics | problem? ▽

Dugg by 4 Friends — 1326
- David
- Steffi18 (0)
- Robert (0)
- Halpier (10)

364 diggs | dugg!
DVD: Amadeus Director's Edition
⊙ submitted by JenJen 8 hours 56 minutes ago (via http://www.movienews.com/vi...)
Starring Tom Hulce and Oscar winner F. Murray Abraham, 1984's Best Picture has just been released in a 3-disc DVD set. Price: $29.95. More...
💬 21 Comments | blog this | email this | category: entertainment>>movies | problem? ▽

Dugg by 3 Friends
- Halpier (10)
- Steffi18 (0)
- Robert (0)

237 diggs | dugg it
Coffee on Wheels
⊙ submitted by Kirchoff 1 day 6 hours ago (via http://www.coffeewheels.com)
24hour coffee delivery service in Boston. More...
💬 11 Comments | blog this | email this | category: service | problem? ▽

Dugg by 6 Friends
- JenJen
- Halpier (10)
- Steffi18 (0)

FIG. 17B digg dialogg | Sign Out

Who should we interview next? You decide! [2 days remain]

2002

326 diggs [digg it]
Candidate: Tom Smith, Astrophysicist
submitted by DoDo 7 hours 20 minutes ago (www.edu/scienceguy/....)
A scientist working on cool stuff! More...
21 Comments   Topic: Science   Problem?

100 diggs [duggt]
Candidate: Jenny Jackson, CEO ACME
submitted by Eve 9 hours 20 minutes ago (www.acm.com/aboutjenny....)
The first CEO to.... More...
91 Comments   Topic: Business   Problem?

100 diggs [duggt]
Candidate: Mr. Moose, Movie Star
submitted by Joe 17 hours 20 minutes ago (imdb.com/userMRMOOSE....)
He has just completed his 100th movie, which will be in theatres next week! More...
2 Comments   Topic: Entertainment   Problem?

FIG. 20

AUDIENCE PLATFORM

CROSS REFERENCE TO OTHER APPLICATIONS

This application is a continuation of U.S. patent application Ser. No. 12/543,503, which was filed Aug. 18, 2009, is entitled "Audience Platform" and issued Mar. 19, 2013 as U.S. Pat. No. 8,402,374, and which claims priority to U.S. Provisional Patent Application No. 61/182,745, filed May 31, 2009 and entitled "Audience Platform," all of which are incorporated herein by reference for all purposes. This application is related to U.S. patent application Ser. Nos. 13/781,327, filed Feb. 28, 2013, and 13/785,239, filed Mar. 5, 2013, both of which are entitled "Audience Platform."

BACKGROUND OF THE INVENTION

Typically, questions posed to political candidates, celebrities, and other interviewees (collectively "individuals") are formulated by, selected by, or otherwise vetted by an editor or journalist. Unfortunately, such questions may not correspond with the interests of an audience. And, which individuals should be interviewed or otherwise recognized, are typically selected exclusively by editors and, again, may not correspond with the interests or opinions of an audience.

BRIEF DESCRIPTION OF THE DRAWINGS

Various embodiments of the invention are disclosed in the following detailed description and the accompanying drawings.

FIG. 1B illustrates an embodiment of an interface to a preference system.

FIG. 4B illustrates an embodiment of an interface to a preference system.

FIG. 5 illustrates an embodiment of an interface to a preference system.

FIG. 10 illustrates an embodiment of a visualization interface.

FIG. 13A illustrates an embodiment of an interface to a preference system.

FIG. 17A illustrates an embodiment of a portion of an interview permalink.

FIG. 17B illustrates an embodiment of a portion of an interview permalink.

FIG. 20 illustrates an embodiment of a candidate selection page.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
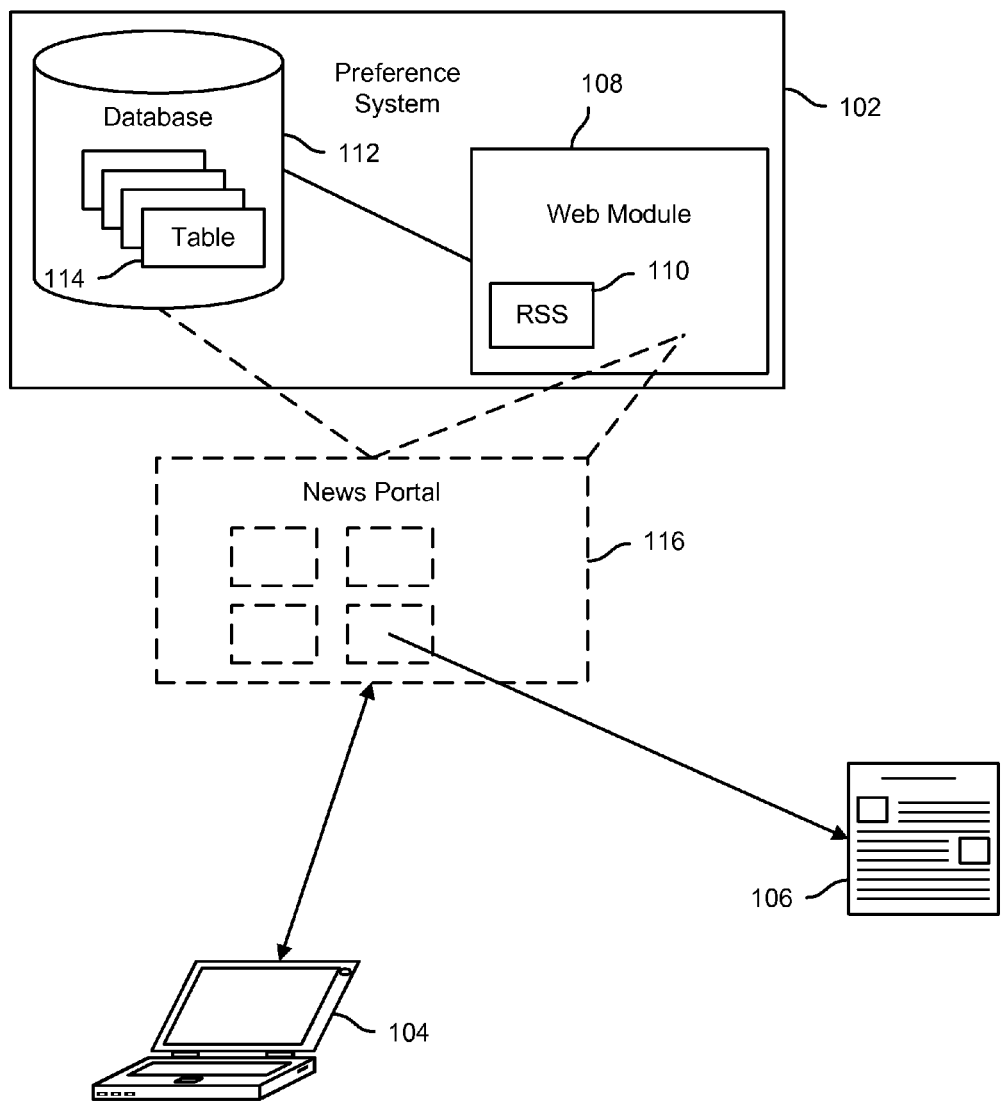
FIG. 1A illustrates an embodiment of an environment for collecting and managing content contributions.

FIG. 1A illustrates an embodiment of an environment for collecting and managing content contributions. Users, such as user 104, submit content (hereinafter a "story contribution" and a "third party news article contribution") to preference system 102. In the example shown, content is submitted in part by providing to preference system 102 the uniform resource locator (URL) of a story, such as a story found on web page 106.

Preference system 102 includes a web module 108 that provides typical web server functionality such as serving website 116, capturing user input, and providing Really Simple Syndication (RSS) feed (110) support. In the example shown, web module 108 is an Apache HTTP server that supports running PHP scripts. Web module 108 is interfaced with a database 112, such as through a MySQL® database backend.

As described in more detail below, users are made aware of the submitted content through website 116 and features such as RSS feeds. In addition to providing a link to the content (e.g., a hyperlink to web page 106) and information such as a summary of the story and the date and time it was submitted, website 116 permits users to indicate their preferences for the content by making a variety of interactions. For example, users can "digg" a story to indicate their like of its content, "bury" a story to indicate problems with the content, and may also take other actions such as commenting on the content. These actions (including the initial submission of the content contribution) are referred to herein collectively as "preference events."

Whenever a preference event occurs (e.g., whenever a user submits, diggs, buries, or comments on content), the event is recorded in database 112 along with associated information such as the identity of the user and a time/date stamp. As described in more detail below, information recorded in database 112 is used in a variety of ways, such as in conjunction with visualization tools that query database 112 and/or make use of data extracted from database 112.

In some embodiments, the infrastructure provided by portions of preference system 102 is located on and/or replicated across a plurality of servers rather than the entirety of preference system 102 being co-located on a single platform. Such may be the case, for example, if the contents of database 112 are vast and/or there are many simultaneous visitors to site 116.

FIG. 1B illustrates an embodiment of an interface to a preference system. The example shown is an implementation of a portion of website 116, as rendered in a browser. A user, known as "Alice" is logged into site 116. Interface 150 includes a sidebar 152 that provides access to various system services. For example, by selecting region 154 of sidebar 152, Alice is presented with an interface that permits her to view her profile and manage account settings such as her current email address and password; view previous preference events she's taken (her "history"); and access friend-related features described in more detail below. Region 156 provides an indication of whether Alice has any messages and will present her with an interface to a message system (such as a mailbox) if selected. As described in more detail below, by selecting region 158, Alice will be presented with an interface through which she can submit a news story for inclusion on system 102.

Region 160 displays a list of categories into which news stories are grouped. If "View All" is selected, stories from all categories will be displayed in story window 164. As shown, the "Technology" category is selected. In some embodiments, visual indications of what category is selected are presented. In the example shown, the selected category is highlighted (represented here by stippling) at 166, and the title of the category appears above story window 164 at 168. In some embodiments, Alice can configure which topics are available to her on site 116. For example, if Alice dislikes Sports, she can configure interface 150 to never show her any sports-related stories, even when viewing using the "View All" option.

Story window 164 typically includes one or more story entries 170. In the example shown, a story entry includes the title of a story, as well as other associated information, such as who submitted the story and when, the external URL of the story, the category to which the story belongs, and a summary of the story. As described in more detail below, links are provided to the story directly (such as by clicking on the title), as well as to an area of site 116 associated with the story, referred to herein as the story's permalink. For example, by clicking on the comments link (176) of the story, Alice will be presented with the comments portion of the permalink described in more detail below.

Story entry 170 also includes a problem reporting region 178. Users may report problems for a variety of reasons. For example, the first story entry and the third story entry shown describe the same news—scientists superheating a gas. Alice has selected the problem, "duplicate" story, from problem reporting region 178. As described in more detail below, this is one form of burying a story. In some embodiments, buried stories are displayed differently, or removed entirely from the user's interface. In the example shown, once a story is buried, it is greyed out, represented here by stippling (180).

As described in more detail below, each story has one or more scores associated with it. In the example shown, the "digg" score (172) for each story is displayed, as is an interactive region beneath the score (box 174) that allows a user to "digg" the story. The first story has been dugg 237 times, but has not been dugg by Alice. As described in more detail below, if Alice were to select region 174, a variety of actions would be immediately taken, including increasing the digg score of the story and updating the region's text from "digg it" to "dugg!," as shown in region 182.

Alice is currently viewing a "promoted stories" (184) view of story window 164. This means that all of the stories presented to Alice on the current view of the interface have exceeded a promotion threshold. One example of a promotion threshold is the raw number of diggs. Other requirements/factors may be used for thresholding in addition to or instead of a digg score, such as requiring that a certain amount of time elapse between story submission and story promotion, the speed with which stories are being dugg, information associated with users that have dugg the story, etc. Because some threshold of users must agree that a story has merit before being promoted, stories shown in promoted view 184 are unlikely to contain spam or otherwise be inherently inappropriate for Alice's viewing.

In some embodiments, different thresholds are used for different stories, such as for stories in different categories. For example, the promotion of a math-related story may only require 100 diggs whereas a story about the president may require 500 diggs.

If Alice selects the upcoming stories tab (186), only stories which have not yet met the appropriate threshold will be displayed. For example, newly submitted stories which have not yet been "dugg" by a sufficient number of people will be presented by selecting tab 186. In some embodiments, if a story languishes in the upcoming stories pool for more than a certain period of time without receiving a sufficient digg score to be promoted (e.g., for a week), the story is removed from the pool and can only be found via its permalink or through a search. In some embodiments, such stories are deleted from database 112. Such stories are typically indicative of spam, inaccuracies and old news. Similarly, if enough users bury a story, the story may be removed from the pool and/or database 112.

In other embodiments, other views of stories may be presented as applicable, such as a view that unifies both the promoted and the upcoming stories. In the example shown, because Alice has selected the "Technology" category (166), only technology related stories are presented in the promoted stories (184) and upcoming stories (186) views. Similarly, the topics of the presented stories (e.g., "Math," are all subtopics of Technology). In some embodiments, the information presented with the story entry may vary, such as from topic to topic. For example, if Alice selected "View All" at 160, the listed topic may be the top level category to which the story belongs (e.g., "Technology") or include a drilled down description (e.g., "World News—Canada—Elections").

As described in more detail below, portion 162 of interface 150 displays the recent activities (preference events) of Alice's friends. For example, in the last 48 hours, Alice's friends have submitted two stories, dugg twelve stories, and commented on sixteen stories, as reflected in dashboard 162. Of the twelve stories her friends have dugg, four of the stories have not yet been promoted. In some embodiments, assorted visual cues of her friends' activity are presented throughout website 116. In the example shown, stories dugg by Alice's friends are notated by a banner (184) placed across the digg score. In other cases, other cues may be used, such as by changing the color of the story, and/or interactive behavior such as playing a sound or showing the friend's avatar icon when, for example, Alice's cursor hovers over a story dugg by a friend.

Region 188 displays a list of tools, such as visualization tools, that Alice can use to view and interact with content and/or preference events.

Story Submission

Figure 2:
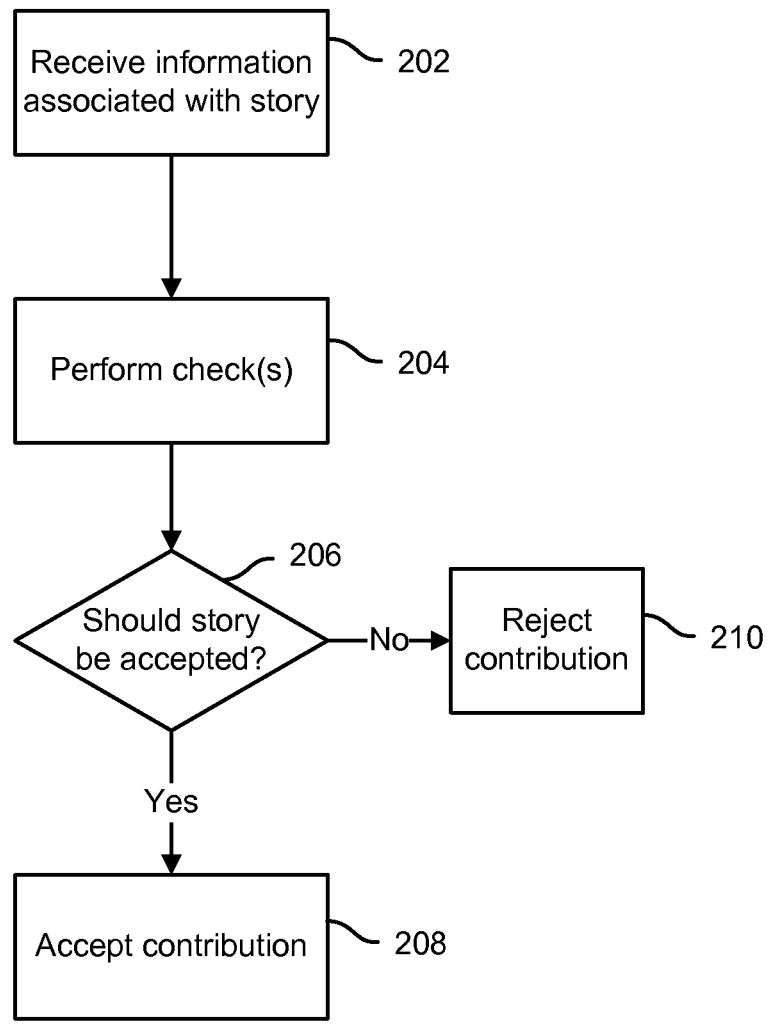
FIG. 2 is a flow chart illustrating an embodiment of a process for receiving a story submission.

FIG. 2 is a flow chart illustrating an embodiment of a process for receiving a story submission. This process may be implemented on preference server 102. In the example shown, the process begins at 202 when information associated with a story is received. For example, in some embodiments at 202, information such as the URL of a story and a summary of the story located at that URL is received.

At 204, one or more checks are performed. As described in more detail below, examples of checks include checking to make sure the URL is valid and does not, for example, contain a typo; checking for duplicate stories; determining whether the story submission appears on a blacklist or is otherwise to be blocked; determining whether the story is being submitted by a blacklisted user; determining whether the story is being submitted by an anonymous proxy, etc. At 206, it is determined whether the story should be accepted.

In some embodiments, if the story submission fails any of the checks performed at 204, the story is rejected at 210. In some embodiments, a threshold is applied to determine whether or not a story is accepted at 208. For example, a story that appears to be a duplicate may be flagged for review by an administrator, may be provisionally marked as a potential duplicate, may be accepted so long as no other checks are failed, etc. In some embodiments, the identity of the submitter is taken into consideration when determining whether to accept a story. The decision of whether to accept the story may be based at least in part on factors such as the length of time the user has been a registered user of site 116, whether the user has previously submitted inappropriate content, and/or a score assigned to the user.

Typically, the information received at 202 is received through a web interface, such as a story submission form that can be accessed, by selecting region 158 of interface 150. Other methods of submission may also be used, as appropriate. For example, an external website, such as a user's blog, could be configured to provide an interface to server 102. Submission may also be automated, such as by syndicating a news feed to a story submission component executing the process shown in FIG. 202. As described in more detail below, submissions of the information received at 202 can also occur through the use of an application program interface (API), browser plugin, etc.

Figure 3:
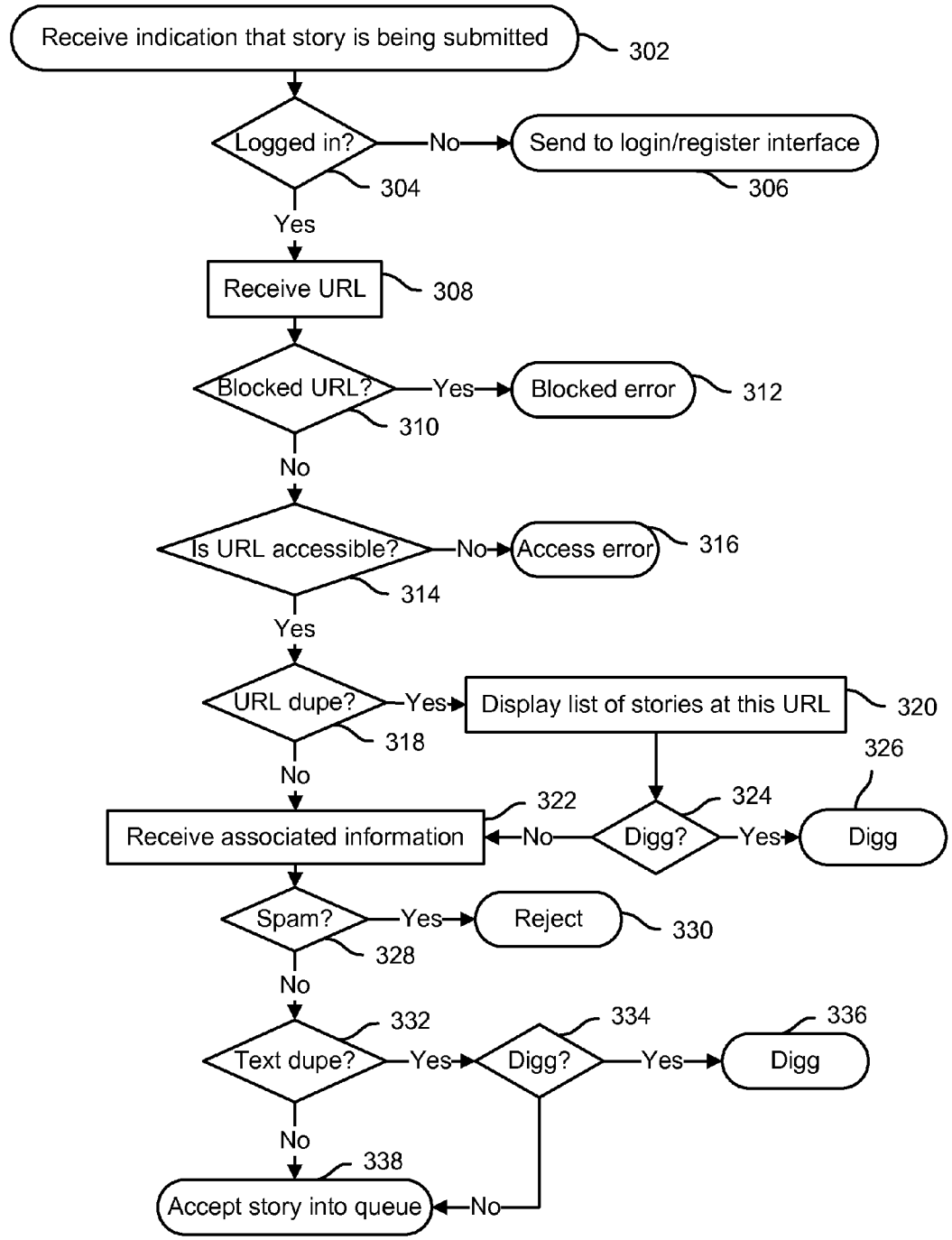
FIG. 3 is a flow chart illustrating an embodiment of a process for receiving a story submission.

FIG. 3 is a flow chart illustrating an embodiment of a process for receiving a story submission. In the example shown, the process is implemented on preference server 102 and is an example implementation of the process shown in FIG. 2. The process begins at 302 when an indication that a story is being submitted is received. Suppose Alice wishes to submit a story. When she selects region 158 of interface 150, server 102 is notified at 302.

At 304, it is determined whether the submitting user is logged into site 116. If not, the user is presented with a page at which he or she can create an account or log in to an existing account. After completing registration and/or logging in, the user is directed back to the story submission interface (not shown).

A logged in user, such as Alice, is then presented with an interface through which a story may be submitted, such as a web form. At 308, a URL is received, such as via Alice entering the URL into the form.

System 102 maintains a block list that includes URLs that, for example, have been reported by administrators as spam sites, fraudulent sites, etc. If a threshold number of users report a story (such as through region 178 of interface 150), the story may be automatically added to the block list. At 310 it is determined whether the URL is present on the list of blocked URLs. In some embodiments, instead of or in addition to maintaining a list of blocked URLs, system 102 checks for blocked URLs in conjunction with a third party, such as a commercial anti-spam registry. If the submitted URL appears on the blocked list, the user is presented with an error at 312. In various embodiments, the error indicates to the user the problem with the URL, such as that the URL belongs to a known spammer. In such cases, the user may be presented with the option of challenging the block. In other embodiments, a user submitting a blocked URL is not told why the URL is blocked, or may not be told that the URL is blocked at all. For example, a spurious "system configuration" error may be presented to the user to help minimize attempts at circumventing checks.

At 314, it is determined whether the URL can be reached. One way of performing this check is to make use of a tool such as curl or wget. If the URL cannot be reached, for example because of a typo (e.g., HTTP Status Code 404) or because accessing the URL requires a login/password (e.g., HTTP Status Code 401), the user is presented with an error at 316. In various embodiments, the user is permitted to revise and resubmit a failed URL without having to restart the process at 302.

Duplicate checking is performed on the URL at 318. In some embodiments, the check performed looks only for exact matches of the URL. In other embodiments, fuzzy or other matching is applied.

If it is determined that the submitted URL is a duplicate of, or similar to, a URL previously submitted to server 302, at 320 the user is presented with a list of the previously submitted story or stories. In some cases, the new story submission is a duplicate of an existing story submission. In other cases, however, the stories may be distinct, despite sharing a common URL. Such may be the case, for example, with a corporate website that always posts new press releases to the same URL, such as "www.company.com/news.html." Suppose Alice submits a URL that is already stored in database 112. At 320 she is asked to compare her story against the other story or stories submitted under that URL (324). For example, the interface may present to her a list of the existing stories matching her submitted URL in a format similar to story window 164 shown in FIG. 1B. If the story she wishes to submit has already been submitted, she can digg the existing story (326) rather than submit a duplicate. If her story is not a duplicate, she can continue with the submission. In various embodiments, considerations such as the sophistication of the user determine whether an exact duplicate URL will be permitted or whether the user will be forced to digg one of the stories presented on the duplicate list instead of submitting the new story submission.

At 322, the user is prompted to supply additional information about the story submission, such as the story's title, a summary of the story, and to which category or categories it belongs. In some embodiments, the information collected at 322 is received at the same time that the URL is received (308) and portion 322 of the process shown in FIG. 3 is omitted.

At 328, additional checks are performed on the story. For example, a spam story may escape detection at 310. Such may be the case if the spam was recently created or is an attempt to unscrupulously drive traffic to a previously legitimate page and is not already present in a blacklist. One check that can be performed at 328 includes applying spam detection techniques to the text located at the submitted URL and/or the title or summary provided by the user. Additional checks may also be employed in addition to or instead of spam checks at 328. For example, a determination may be made of whether the submitter (e.g., Alice) is connecting to site 116 via an anonymous proxy. If it is determined at 328 that the submission is spam or should otherwise not be accepted, at 330, the submission is rejected. In some embodiments, the submission is "silently" rejected—the user is shown a "successful" dialogue when, in fact, the story is rejected. In other embodiments, the user is presented with an error, such as the error presented at 312.

Additional duplication checks are performed on the story at 332. In some embodiments, the submitted title and summary of the story are compared against the titles and summaries of stories already submitted to server 102. In some embodiments, the page is crawled and a full text match (such as a MySQL® full text search) is performed against the submitted story and previously submitted stories. In such a case, database 112 is configured to store at least portions of the crawls in addition to information associated with the story. If it is determined that the story is a potential duplicate, at 334 the user is presented the option of digging the story (336) or submitting it anyway.

When a story is accepted at 338, an entry for the story submission is created in database 112. Information such as the submission time and the user who submitted the story are stored, and counts associated with the story, such as its digg score, are set to zero. The story becomes accessible in the upcoming stories view (e.g., 186 of FIG. 1B).

Information in one or more tables 114 is also updated to include information associated with the new story, for example for use in conjunction with searching and with visualizations discussed in more detail below. Additionally, information associated with the submitting user is modified as appropriate. For example, a count of the number of stories submitted by the user is incremented, and the story is made available in areas such as the user's profile and the profile areas of the user's friends, if applicable.

As described in more detail below, a permalink for the story can be accessed by visitors to site 116 and contains content assembled dynamically from the information stored in database 112. In system 102, the permalink's URL is created by stripping disallowed characters (such as punctuation) from the submitted story's title and appending digits as necessary to avoid collisions. So, for example, if Alice's submitted story were titled "New Species of Bird Discovered," once accepted at 338, information associated with the submitted story would be accessible at the URL corresponding to digg.com/science/New_Species_of_Bird_Discovered.html.

Also at 338, if the user has specified blogging information, such as a username and password of an account on a blogging service, the submitted story is posted to the user's blog. Information such as the summary and/or title of the story can be automatically copied into the blog submission and/or edited by the user prior to submission. For example, if Alice has specified the details of her blog account in her profile (reachable by selecting portion 154 of interface 150), when submitting story submissions, she can specify whether she'd like the story to also appear in her blog. If Alice has not configured her blog settings, the ability to blog can be greyed out, hidden, and or explained at 338, as applicable.

Recording and Reflecting Preference Events

Figure 4A:
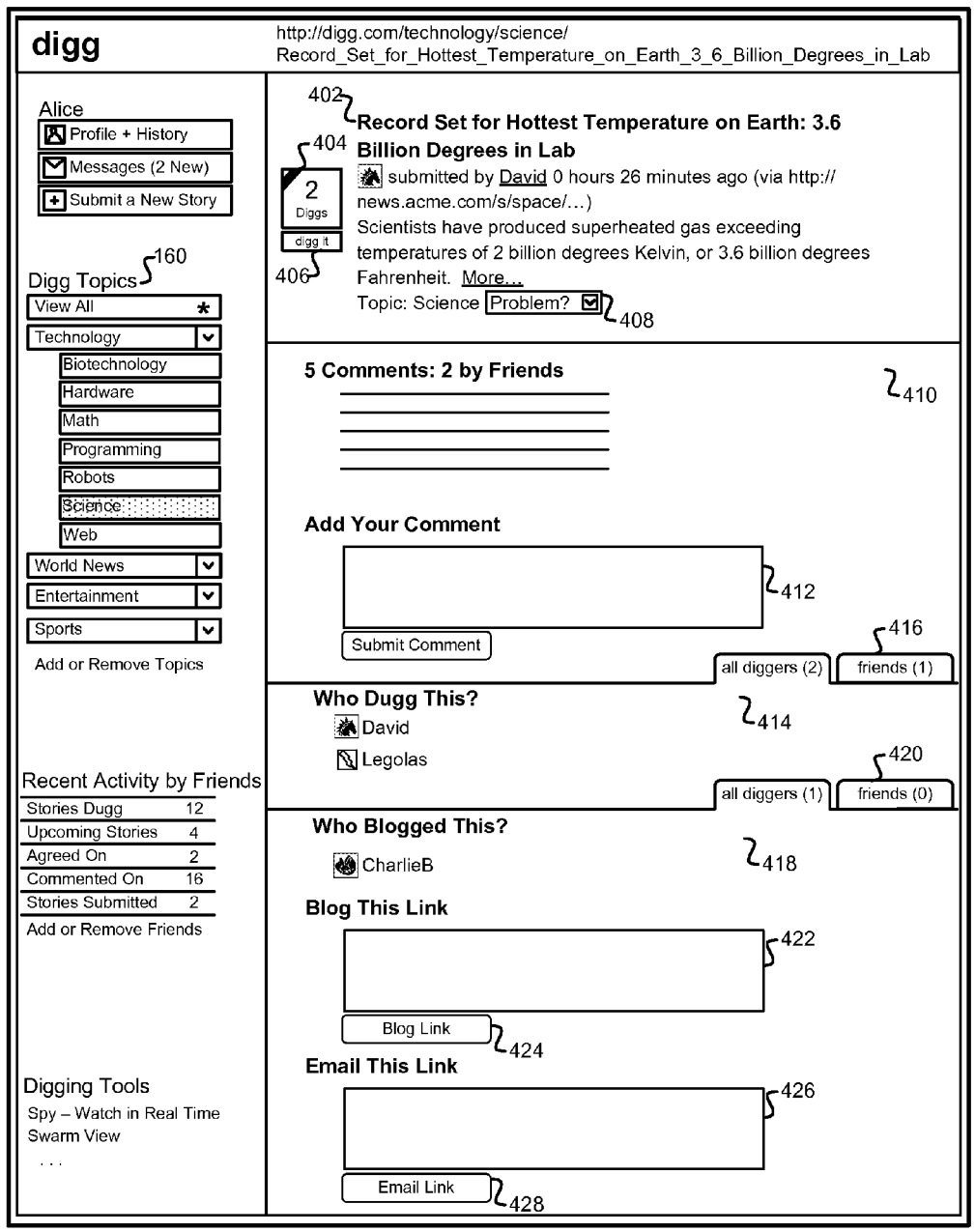
FIG. 4A illustrates an embodiment of a story permalink.

FIG. 4A illustrates an embodiment of a story permalink. The example shown is an implementation of a portion of website 116 as rendered in a browser. Story 402 was recently submitted to server 102 (26 minutes ago), through the process depicted in FIG. 2. When Alice visits the permalink of story 402, topic region 160 of sidebar 152 automatically expands and highlights the topic with which story 402 is associated (in this case, "Science"). The story was submitted by David, who also dugg the story. Alice has David listed under her profile as her friend. As a result, the digg count includes a visual indication 404 that story 402 was dugg by a friend. In some cases, Alice and David know each other and have each other, mutually, on their list of friends. In other cases, the relation may be one-sided. For example, David may be a columnist or famous personality whose opinion Alice values.

The digg score of story 402 is currently two (404) and the story has not met the threshold(s) required for the story to be promoted out of the "upcoming stories" area.

In the interface shown in FIG. 4A, Alice can click digg box 406 to indicate her preference for the story. In some embodiments, additional actions are taken when Alice diggs a story. For example, if she has configured her blog settings, Alice can specify that stories that she diggs be posted to her blog as she diggs them. Similarly, Alice can configure her personal website (e.g., with a JavaScript) to automatically syndicate recent activities taken in response to stories.

She can report a problem with the story (bury it) by selecting an option from problem dropdown 408. Story reporting options include "duplicate" story (to report that story 402 is a duplicate of another story), "bad link" (to report that the link to the full text of the story is defective), "spam" (to indicate that the story is fraudulent or spam), "inaccurate" (to indicate that there are factual problems with the story), and "old news" and "this is lame" to indicate that the story is not newsworthy. In some embodiments, bury events are anonymous site-wide and are not replicated, for example, in a user's publicly accessible digging history. One reason for this is to minimize the chance of a "flame war" occurring, such as when a well known user negatively rates a story or comment, for example.

As described in more detail below, region 410 displays comments that users have made about story 402. Thus far, a total of five comments have been left about story 402, two of which were left by Alice's friends. Alice can submit comments by entering information into region 412 of FIG. 4A.

In region 414, Alice is currently viewing a list of all the users who dugg story 402. Suppose David is Alice's friend, but Legolas is not. If Alice selects friends tab 416, the view in region 414 will change to show only David's name and avatar icon.

In region 418, Alice is currently viewing a list of the users who have blogged story 402. Charlie is the only person who has blogged the story so far and he is not Alice's friend. Therefore, if Alice were to select friends tab 420, no names would be shown.

Alice can submit this story to her own blog by entering optional text in region 422 and selecting region 424. Alice can email the story to one or more addresses by entering them into region 426 and selecting region 428.

As shown, all of the information associated with a particular story (e.g., title/summary of the story, digg score, comments, who has blogged the story, etc.) is displayed on a single page. In other embodiments, the information is presented across multiple pages, such as with a tabbed view with one or more tabs for each component.

Figure 4B:
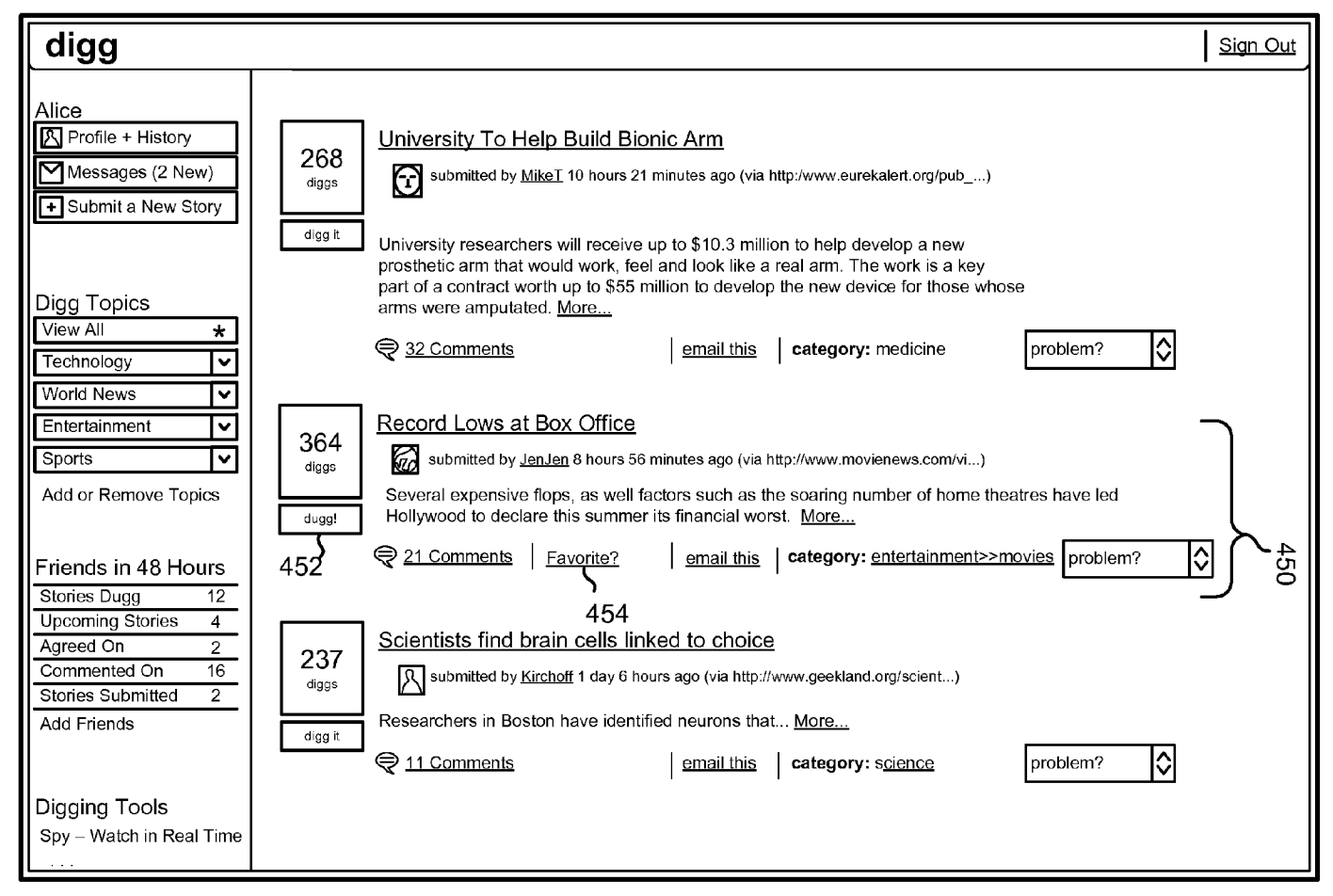

FIG. 4B illustrates an embodiment of an interface to a preference system. The example shown is an implementation of portion 410 of website 116, as rendered in a browser. In the example shown, Alice has just dugg story 450 by selecting region 452. As a result, rather than a "digg it" message appearing in region 452, a "dugg!" message is displayed. Also as a result of having dugg story 450, a new region (454) is presented to Alice, asking whether she would like to mark the story as a "Favorite." If Alice selects the "Favorite" region (e.g., by clicking on it), story 450 will be listed as a favorite in Alice's profile, discussed in more detail below. In some embodiments, rather than displaying a separate "Favorite" region 454 after Alice diggs a story, instead of a "dugg!" message, a "Favorite?" message is displayed in region 452. If Alice clicks on region 452 again, story 450 will be listed as a favorite in Alice's profile. In such an embodiment, Alice is thus able to interact with region 452 twice—once to "digg" the content, and again to designate the dugg content as being a favorite.

In some embodiments, rather than or in addition to specifying a favorite, users can designate content as being a "least favorite," "most hated," or any similar strongly negative preference.

Favorites can also be specified relative to periods of time. For example, a user may be allowed to designate a favorite of the day, or a favorite of the week/month/etc. If the user updates the favorite during that time period, the newly-designated favorite becomes the favorite of the day/week/month until the end of the day/week/month until the day/week/month ends. Once the unit of time has ended, the favorite is saved as (e.g., "last week's favorite").

Figure 4C:
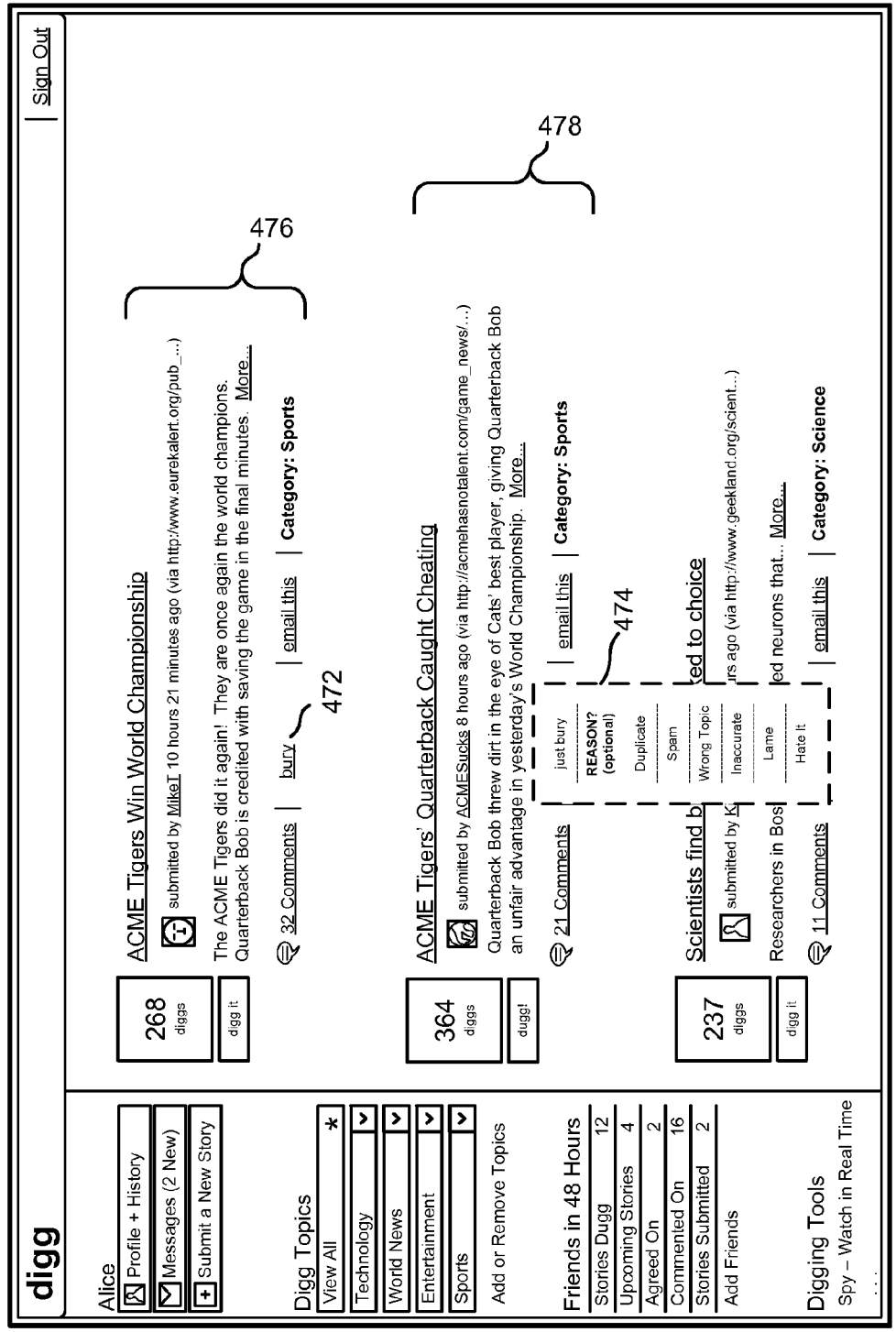
FIG. 4C illustrates an embodiment of an interface to a preference system.

FIG. 4C illustrates an embodiment of an interface to a preference system. The example shown is an implementation of a portion of website 116 as rendered in a browser. In the example shown, stories 476 and 478 concern the ACME Tigers, Alice's favorite sports team. A rumor exists that ACME's quarterback cheated during a recent game. Alice does not believe that the quarterback cheated and is very upset by any suggestion to the contrary. Alice agrees with the content in story 476, but does not agree with the content in story 478 and decides that she would like to bury story 478—not because of a subject-agnostic reason, such as that the story is a duplicate or includes advertising, but because she holds very strong, personal beliefs, about the subject matter.

She moves her mouse pointer to the bury link (e.g., 472 in the case of story 476) of story 478 (not shown) and hover box 474 appears. Alice can bury the story without giving a reason by clicking on the "just bury" portion of the box. Alice can also provide a reason for her bury by selecting one of the options shown. If Alice buries the story by clicking on the "just bury" text, a database entry will be made reflecting that Alice has chosen to bury the story but given "no reason" (e.g., a default value), and Alice's bury may or may not contribute toward whether the story is removed from the site (e.g., based on how many other "default" buries have been received, and factors such as how long Alice has been a registered user of the site, what category the content is in, and so on). If Alice selects one of the other options, that information will also be reflected in a database entry (and may count differently when determining whether to remove the story). Buried stories are viewable from Alice's profile (e.g., via a "My Buried Stories" tab), and may be unburied by Alice if desired.

The bottom option shown in box 474, "Hate It" is different from the other optional reasons for burying content. If Alice selects that reason, e.g., by clicking on it, Alice performs what is referred to herein as a "placebo bury." A placebo bury appears to Alice to be no different than a "spam" bury or a "duplicate" bury. For example, if she selects "Hate It," story 478 will be removed from her display, and be listed as having been buried by her in her profile. However, no additional actions will be taken with respect to the story and other users' ability to access it. The placebo bury allows users to express their (potentially extreme) personal dislike of certain content without impacting others. Typically, a user enraged enough to "hate" a story is unlikely to hold an objective view about the merits of the story with respect to other users (e.g., the newsworthiness of the content). In some embodiments, after performing a placebo bury, Alice is presented with the ability to designate the story as her "least favorite" and the techniques described in conjunction with FIGS. 4B, 6B, and 6C are adapted to accommodate Alice's designation accordingly.

In various embodiments, the options provided in box 474 vary based on factors such as the category and type of the content. For example, for sports news articles, "Hate It," and "They Suck!" might both be provided as placebo options. Different placebo text and numbers of placebo options might be presented in celebrity and politics sections. In the case of restaurants, books, music, and other types of content that are categorized by genre, examples of placebo options include "Not My Style," and "Not My Thing," allowing the user to indicate that he doesn't like ABC Restaurant because he doesn't like French food—not because the food at ABC Restaurant was improperly prepared or the service was lacking, and without impacting a score or rating of the restaurant/book/music. Further, in the case of some content, such as restaurants, a "Hate It" bury may contribute to the score of the restaurant and not be used as a placebo option.

As another example, some individuals hold very strong beliefs about companies, such as manufacturers of cola, computer manufacturers, and car companies. An example of a non-placebo option for burying a product is "Mine Broke," which would allow a user to indicate that the product was flimsy. An example of placebo option for burying a product is "Just Don't Like it," which a user that doesn't like the color of the product or has another non-functional issue with the product can use without impacting the digg count or other ratings of the product.

In the case of video clips and photographs, examples of placebo options include "I am offended by this," and "I don't get it." In some embodiments the selection of placebo options by users is used to determine a rating or score for the content. For example, suppose a video receives several "I don't get it" buries, but also receives several diggs. A rating of the film across all voters can be tabulated by combining the indications of the two groups of users.

FIG. 5 illustrates an embodiment of an interface to a preference system. The example shown is an implementation of portion 410 of website 1106, as rendered in A browser. In the example shown, Alice is viewing comments associated with a story. The story currently has eight comments (502), sorted by date. A threshold of −4 diggs or higher has also been applied (518). Thus, comment 516, which has been buried 75 times, is hidden. In the example shown, only the header of a buried comment is displayed, along with a link to reveal the hidden comment (522). Additionally, the header of comment 516 is greyed out to help a user visually distinguish between buried and nonburied comments.

Comment 504 was written by Bob, one of Alice's friends, as was comment 506 (written by David). In this example, comments written by friends are distinguished from other comments, such as through having a differently colored header. Comments dugg by friends are also distinguished. Thus, while CharlieB is not Alice's friend, his comment (508) is distinguished because it was dugg by Bob, who is Alice's friend, as also indicated by the inclusion of Bob's name and a star on the header of comment 508. The number of comments left by and/or dugg by her friends is indicated at 514.

In the example shown, Bob has written an informative comment, which 18 people have dugg. If desired, Alice can digg or bury Bob's comment by selecting the appropriate icon at 520. In the example shown, the digg icon is a green thumb pointing up. The bury icon is a red thumb pointing down. As described in more detail below, if Alice selects one of the icons, Bob's comment score is immediately updated and the thumbs are greyed out to indicate to Alice that she's already registered her preference for Bob's comment.

Suppose Alice finds comment 510 to be off topic or otherwise unhelpful. If she chooses to bury the comment, in the example shown, a variety of changes will occur in the interface immediately. The comment score for comment 510 will decrement by one point. Additionally, comment 510 will collapse down to just the header, which will grey out. If Alice finds the poster of the comment, Legolas, a sufficient nuisance, she can block him by selecting block icon 524. In this example, if Alice selects the block icon, she will never be shown any content from Legolas again, site-wide, unless she later chooses to unblock him, such as through settings in her profile. Thus, by selecting block icon 524, Alice will not see comments made by Legolas, stories posted by Legolas, etc., unless and until she chooses to unblock him.

In some embodiments, if enough people bury a comment, the comment is removed from the site and/or reported to an administrator. Similarly, if enough people block a user, in some embodiments the user is reported to an administrator and/or banned from accessing site features.

If desired, Alice can submit one or more comments of her own. For example, she may reply to an existing comment by selecting the reply button associated with the comment (526), or create a new comment by submitting text through region 528. In some embodiments, Alice is given a portion of time during which she may edit the comment, such as within five minutes of submitting the comment.

As described in more detail below, when Alice submits or diggs a comment, that preference event is recorded in database 112, her profile and the profiles of her friends are immediately updated, and associated RSS files are updated.

Figure 6A:
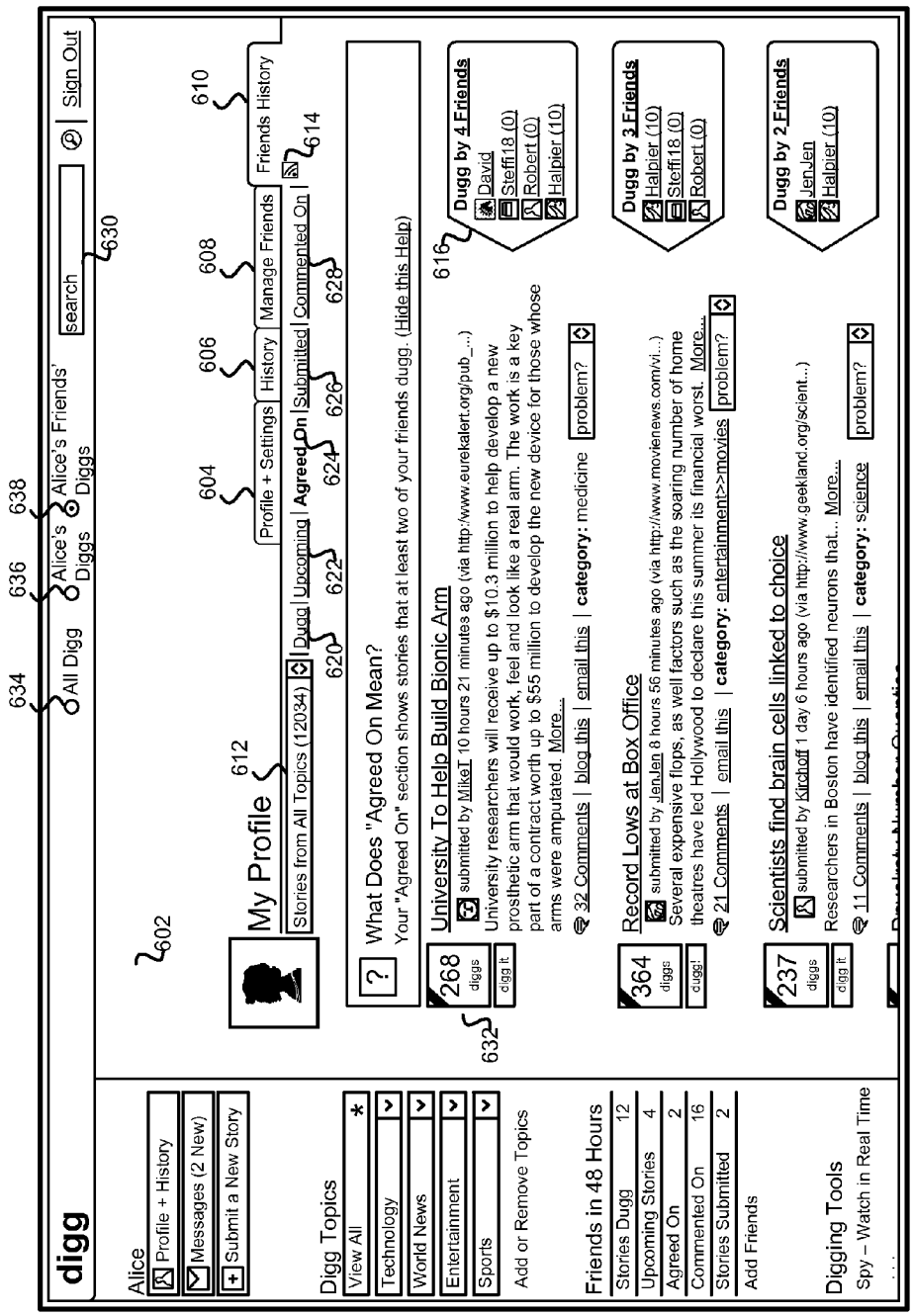
FIG. 6A illustrates an embodiment of an interface to a preference system.
Figure 6B:
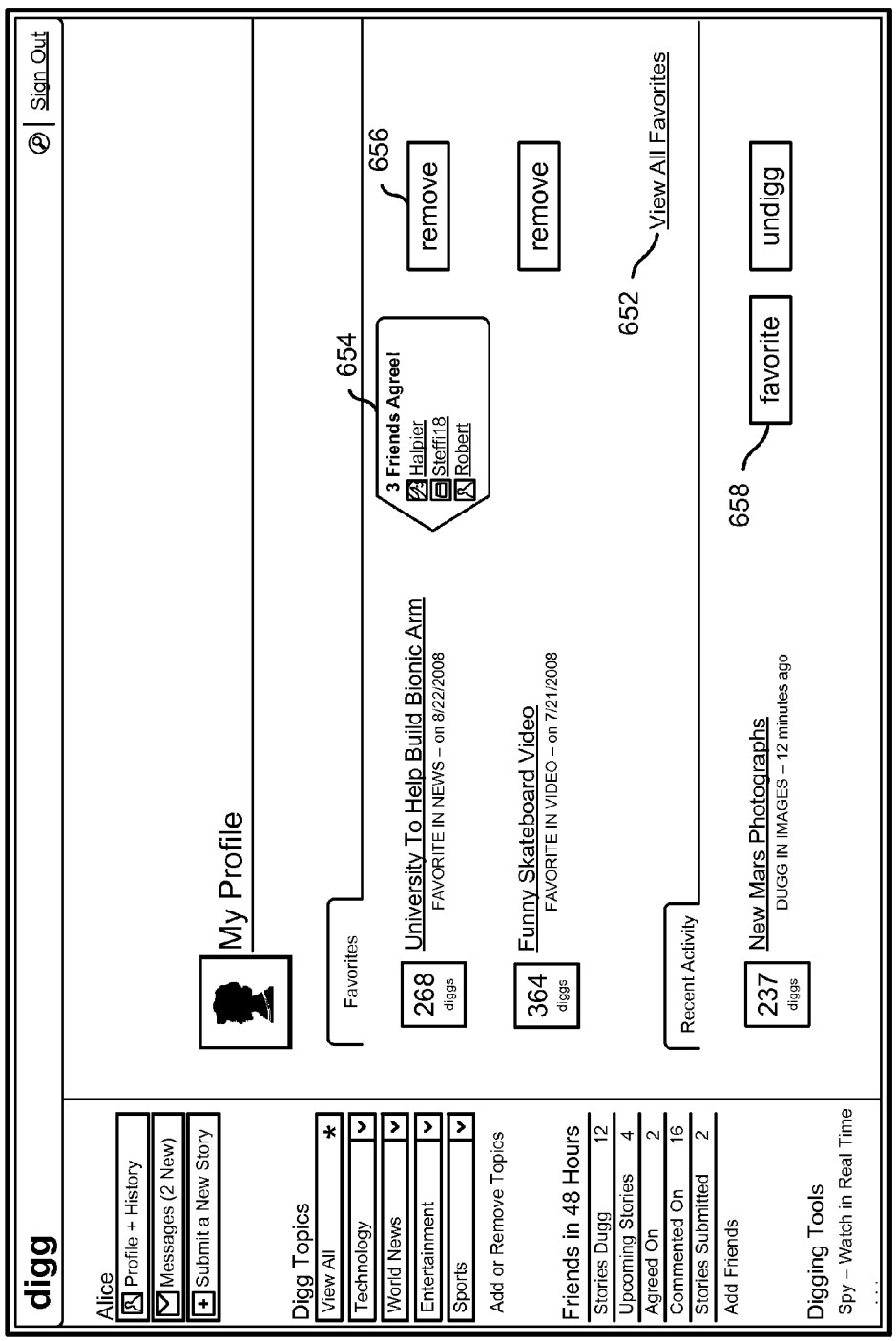
FIG. 6B illustrates an embodiment of an interface to a preference system.
Figure 6C:
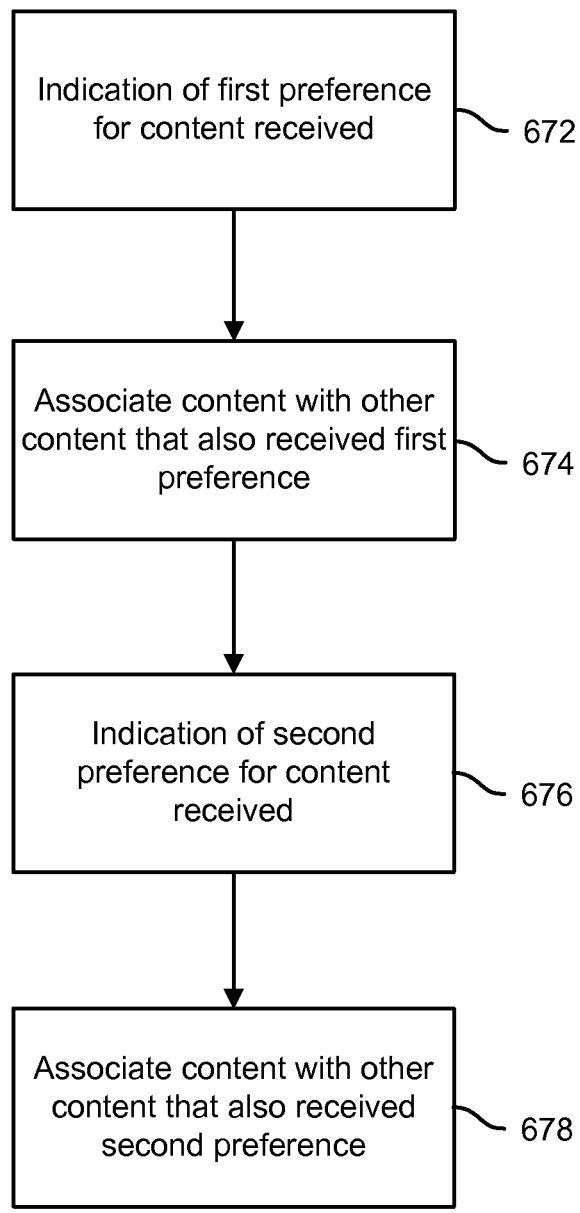
FIG. 6C is a flow chart illustrating an embodiment of a process for recording a user's preference for content.

FIG. 6A illustrates an embodiment of an interface to a preference system. The example shown is an implementation of a portion of website 116 reached by selecting region 154, as rendered in a browser. In this example, Alice is viewing her profile (hereinafter "interface 602"), which has been subdivided into several tabbed views (604-610). A profile provides access to a variety of information, some of which may be publicly viewable, and some of which may be kept private. For example, Alice can change account settings, such as her email address and password, by selecting portion 604 of interface 602. Visitors to Alice's profile will be presented with a subset of the information available to Alice. For example, while Alice sees tab 604 being labeled "Profile+Settings," a visitor to Alice's profile would see tab 604 as leading to Alice's "Profile" only. Similarly, tab 608, which allows Alice to add and remove friends, is only available to Alice and is hidden from visitors to her profile. Alice can also add friends by visiting other users' profiles and selecting an "add this user as my friend" option located in the profile.

Alice has currently selected to view her friends' history by selecting portion 610 of interface 602. The information presented can be further customized by selecting from subsets of information. For example, if Alice selects portion 620 of interface 602, she will be presented with a listing of all of the stories that have been dugg by at least one of her friends. If she selects portion 622, she will be presented with a list of stories that have been dugg by at least one of her friends but have not yet been promoted. If she selects portion 626, Alice will be presented with a list of stories submitted by her friends, and by selecting portion 628, Alice will be presented with a list of stories that have been commented on by her friends. Other information (not shown) may also be presented in other embodiments, such as a list of comments that Alice and/or her friends have dugg.

In the example shown, Alice has selected to view stories "agreed on" by her friends (624). Each of the stories listed in this view have been dugg by at least three of Alice's friends. In various embodiments, Alice can configure the threshold and specify such information as the number of friends (or total number of diggs) required for a story to be agreed upon and/or define particular individuals whose digg is necessary for a story to be considered agreed upon, keywords that must be present in the story, etc. By making use of the "agreed on" view, Alice can readily discern the most important stories, even if she has thousands of friends. (I.e., if she sets the threshold to "agreed on by at least 10 friends," and has 1000 friends, the number of stories she is presented with is likely to be manageable and especially relevant or interesting.)

Region 616 of interface 602 indicates that four of Alice's friends have dugg story 632. Alice can also see which of her friends have dugg story 632 by hovering her input device over the digg score box of story 632. In some embodiments, Alice can interact with region 616, such as by being presented with a dialogue that offers to send an email to all of her friends listed in the region.

By selecting portion 606 of interface 602, both Alice and visitors to Alice's profile will be presented with Alice's history in a format similar to that currently shown, but limited to activities taken by Alice. Additionally, Alice may "undigg" stories and comments that she previously dugg by visiting her history.

All of the views described in conjunction with FIG. 6, such as stories "Agreed On" by Alice's friends, can by syndicated as RSS feeds by selecting RSS link 614 on the appropriate page view. In some embodiments, profile visitors (including Alice) are presented with the option to search (630) all of site 116 for content (634), search Alice's diggs for content (636) and/or search diggs made by Alice's friends for content (638).

When a user takes certain actions, such as digging a story or burying a comment, the results of that action are reflected immediately, without the user being directed to a "success" page or the appearance of, e.g., a page refresh occurring to the user. For example, suppose Bob has listed Alice as his friend. Whenever Alice submits a new story, that new story immediately appears on Bob's "Friends—Submitted" list and is written to the associated RSS file. Similarly, whenever David comments on an article, that fact is immediately reflected under Alice's tab 628 as shown in FIG. 6A. As described herein, pages served by web module 108 include Asynchronous JavaScript and XML (Ajax) components. Other techniques may also be used to dynamically update site 116 as rendered in a browser, as appropriate.

FIG. 6B illustrates an embodiment of an interface to a preference system. In the example shown, Alice is viewing a list of items that she has designated as being her favorite (e.g., by selecting region 454 in FIG. 4B). Alice can designate additional content, such as recently viewed content, as favorite by selecting the appropriate region (658) in her profile.

In some embodiments Alice can have a single favorite item at any given time listed in her profile, also referred to herein as "My #1," indicating that the item is Alice's #1 favorite item. In other embodiments, Alice can have a single favorite item per category (e.g., favorite sports story, favorite politics story) or per type of item (e.g., favorite restaurant, favorite video, favorite news item, favorite podcast). In any of the above cases, if she subsequently marks as "favorite" another item, the newly selected item will replace the corresponding existing favorite item in Alice's profile. Items previously designated as "#1" are noted in an archive of "#1" items that can be accessed (e.g., by following a link 652).

In some embodiments, Alice can designate multiple favorites, in all categories/types of content, and a rolling list of the most recent designations is displayed in her profile, with older favorites accessible via link 652.

In various embodiments the history of Alice's favorites is color coded. For example, more recent favorites are green and older ones are red. Other visual indicators may also be used. For example, the more users that have the same content designated as favorite, the brighter the designation appears. If many users all have the same content designated as favorite right now, that content is "hot" and appears with flames around it in the "Favorite" section of Alice's profile. If only a few people have that content marked as a favorite, the content may be icy cold as indicated by a blue color scheme.

Alice can remove her "favorite" designation of content by selecting region 656. For example, suppose Alice designated a particular MP3 player (one that she owns) as a favorite. The MP3 was actually of poor quality and subsequently broke. Alice does not want other users to think that she still approves of it, so she removes the favorite designation. If instead of breaking, Alice merely received a newer, better player, she may wish to retain the favorite designation for the old player, and also mark as favorite her new player, so that other users know that she likes both players. In some embodiments, if Alice undiggs a particular content, any favorite designations that she may have made with respect to that content are automatically removed.

Alice can also view the favorite content of her friends (and other users) by visiting their respective profiles and selecting a "favorites" tab. Alice can also perform a user search to find other users with similar favorites to discover new friends, and/or to discover new content. For example, Alice could designate a particular restaurant as her favorite and then perform a search to determine "where people who also like my #1 restaurant buy books?" Alice could designate a movie as being her favorite and then determine "what news stories are people who also share my favorite movie reading now?"

Alice can also see which content she and her friends have commonly designated as favorite, such as through information displayed in region 654. In some embodiments Alice can also see the aggregate favorites of her friends by selecting a "see my Friends' #1s" link within her own profile, which in turn shows one favorite per friend, such as the item most recently designated as favorite by that friend. The aggregate view is customizable, and also allows Alice to sort the favorites by the number of friends who at one point in time (or currently) also have designated the content as a favorite.

Statistics on the favorite content of users site-wide is tracked and can be displayed according to different periods of time, different groups of users, different categories/types of content/etc. For example, Alice can view "the content most often designated as favorite of all time," search for "the most frequently #1 restaurant [bar, dry cleaner] in Chicago [or a zip code, or an area code]," see "the product with the most favorite designations right now," search for "the MP3 player with the most #1 designations between December 1 and January 31 of last year," find "the #1 fiction book as designated on the lists of female users between the ages of 13 and 25," and so on. A "top ten" list of favorite content can also be displayed, e.g. showing the relative positions of content based on the number of favorite designations, such as "this story is currently #3 in the ranking, up from #6 last week."

Time-based information can also be used to indicate the "staying power" of the favorite designations for content. For example, if many people leave the same content at the top of their favorite list before replacing it with other content, this statistic can be measured, searched for, etc. Examples include a search for "the content with the longest average streak of being a user's favorite content," "the content that, once designated as a favorite, remains a favorite the least amount of time," and so on.

Favorite content can also be analyzed to determine particular topics or subjects of interest to a user. For example, suppose Alice designates as favorite a photograph of the fictional town of Springfield, a video clip of The Simpsons television show, and a news article about a chain of convenience stores redecorating with a Simpsons theme. Collectively, the content marked as favorite indicates that "The Simpsons" is a concept in which the user has a strong interest.

In various embodiments, RSS feeds are created and updated with information on Alice's favorite content activity and Alice's friends' favorite content activity. Customizable feeds/alerts can also be created so that Alice can, for example, be alerted when a certain number of users mark content containing the keyword Apple, a product titled MP3 player, a new movie, etc. as favorite.

FIG. 6C is a flow chart illustrating an embodiment of a process for recording a user's preference for content. The process begins at 672 when an indication that a user has a first preference for the content is received. For example, at 672, Alice "diggs" story 450 by selecting region 452. At 672, the content is associated with other content that has also received an indication of the user's first preference. For example, at 674, story 450 is associated with Alice's other dugg content (by being added to the list of stories/etc. dugg by her). At 674, an indication that the user has a second for the content is received. For example, at 674, Alice designates story 450 as being her "favorite," such as by selecting link 454. At 678, the content is associated with other content that has also received an indication of the user's second preference. For example, at 678, story 450 is associated with Alice's other "favorite" content.

Figure 7:
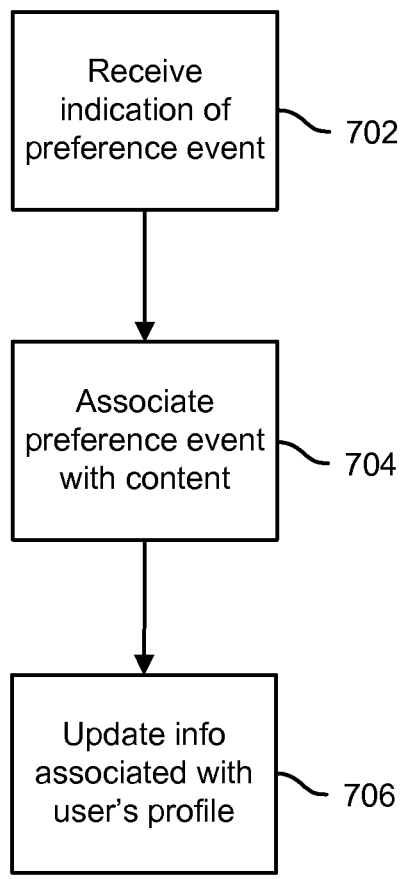
FIG. 7 is a flow chart illustrating an embodiment of a process for recording a preference for a content contribution.

FIG. 7 is a flow chart illustrating an embodiment of a process for recording a preference for a content contribution. The process begins at 702 when an indication that a preference event has occurred is received. For example, when Alice selects digg box 406 shown in FIG. 4, her preference is received at 702. Other examples of preference events include submitting a story, burying a story and commenting on a story. At 704, the preference event is associated with the content contribution and any associated scores are updated as applicable. For example, at 704, Alice and story 402 are linked in database 112 and the digg score of story 402 is increased in database 112 from two to three. At 706, information associated with the user's profile is updated. For example, as described in more detail in conjunction with FIG. 6A, views of Alice's digging history (including the friends' views of users who have listed Alice as a friend) are updated to include the dugg story and an indication that Alice dugg it. Any RSS files associated with her profile and the profiles of those who have her listed as a friend will also be updated as appropriate.

Visualizations

Figure 8A:
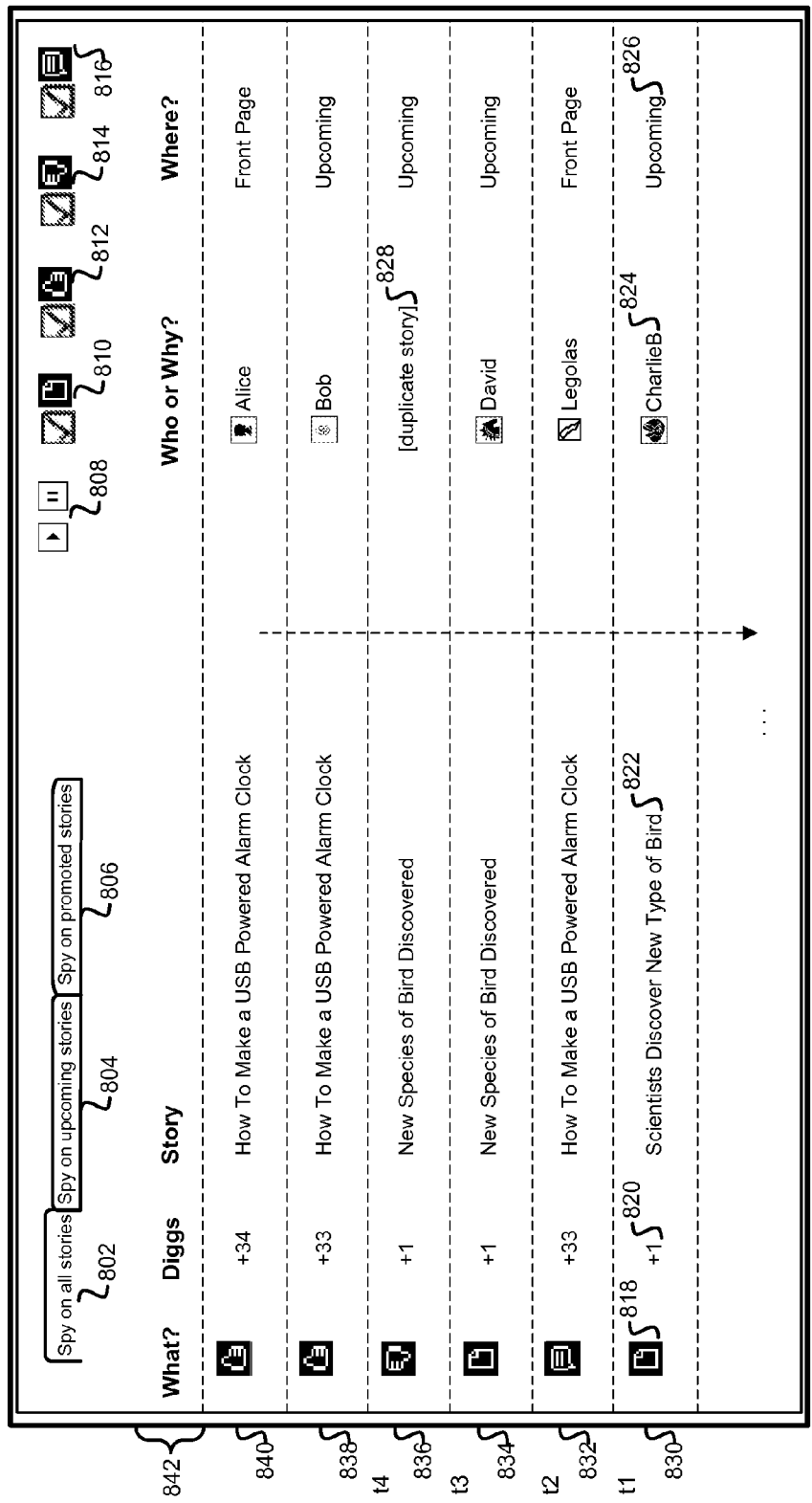
FIG. 8A illustrates an embodiment of a visualization interface.

FIG. 8A illustrates an embodiment of a visualization interface. The example shown is an implementation of a portion of website 116 as rendered in a browser. In this example, interface 800 (also referred to herein as the digg "spy" interface and a "ticker" interface) is configured to present a real time visualization of preference events occurring on preference system 102.

In the example shown, a user such as Alice can specify which stories to spy on. For example, she can spy on all stories (802), stories which have not yet been promoted (804), or just promoted stories (806). Further specification of a subset of stories can also be applied, as applicable. For example, in various embodiments, a user can specify a key word that must be present in all stories being spied upon, and/or spy on stories in specified categories (not shown), and/or spy on events taken by friends only.

Additionally, a user can specify the types of preference events to be spied upon. In the example shown, Alice has checked (would like to see) all types of activity—new story submissions (indicated by icon 810), diggs (indicated by icon 812), buries (indicated by icon 814) and comments (indicated by icon 816).

One way of implementing the visualization shown in FIG. 8A is as follows. As a preference event occurs, it is recorded in database 112. Maintained within database 112 are a main database table and four smaller tables 114—one for each type of event. The event is also recorded (either concurrently with, or on a periodic basis such as by way of an update function) in the respective smaller table that corresponds with the event. In some embodiments, filtering is applied so that, for example, only commenting of registered users is recorded in the comment table but all commenting is recorded in the main table. A flag in the main database (e.g., a "do not report this to spy" flag) can also be set to indicate whether information associated with a particular story or user should be copied to the smaller tables 114. Alice is a typical user whose diggs are recorded in the main database table, as well as the smaller table that records only diggs.

When Alice first visits interface 800 with her browser, and on a recurring basis after that (such as every 20 seconds, or whenever the pool of events is running low), batches of information are retrieved from server 102 in a scope commensurate with the options selected (which documents to spy on and for which activities). Specifically, the most recent content from each of the smaller tables 114 is retrieved from server 102 and stored locally, such as in Alice's browser. Asynchronous JavaScript and XML (Ajax) components in interface 800 cause the information to displayed to Alice, for example, at a rate of one event per second, depending on which information she would like to view. In some embodiments, Alice can control the speed of the display, such as through playback controls 808.

In some cases, such as with heavy digging activity, there may be sufficiently more than 20 diggs occurring site-wide during the twenty second interval between the times that Alice's browser fetches a new batch of digging information. Thus, after twenty seconds have elapsed, system 102 may have recorded 200 digg events—significantly more than the 20 digg events that Alice periodically fetches. In some embodiments, only the most recent 20 actions are fetched. Thus, every twenty seconds, Alice requests the 20 most recent events and will never see any intervening events.

In other embodiments, the number of events fetched adjusts in accordance with the speed with which the events are occurring. In such a case, all of the events are fetched and the rate with which they are displayed is sped up (showing one every tenth of a second if there are 200) or slowed down (showing one every five seconds if there are only four) as appropriate. In some embodiments, a sampling of activity is taken throughout the period so that if 200 events occur during the 20 second interval, a random sample of 20 will be supplied to Alice's browser.

In the example shown in FIG. 8A, Alice has been viewing interface 800 for six seconds. Six events (830-840) are displayed, with the most recent (840) displayed at the top. As a new event is displayed, the already displayed events are pushed down the display. Thus, for example, at time t1 (when Alice first began watching the interface), only event 830 was presented. At time t2 (one second later), event 832 was displayed above event 830, pushing event 830 down the screen. At time t3 (one second after time t2), event 834 was displayed, pushing events 832 and 830 each down one position, respectively.

By consulting the column descriptions (842), Alice can see that event 830 was a submission of a new story (818), titled "Scientists Discover New Type of Bird" (822), that the story was submitted by CharlieB (824), and that the story is currently unpromoted (826) with a digg score of 1 (820). When event 832 appears in the display at time t2, Alice can see that event 832 was a comment by Legolas on a story titled "How to Make a USB Powered Alarm Clock" that currently has a digg score of 33 and has been promoted out of the upcoming stories queue. At time t3, Alice can see that David posted a new story titled "New Species of Bird Discovered." At time t4, David's story was reported as being a duplicate story (828). The identity of a user burying something is not shown. Instead, only the reason for the bury (such as duplicate story, inaccurate story, old news, etc.) is shown. In other embodiments, other information can be displayed, as applicable.

In FIG. 8A, the displayed digg count for a story is shown as what it was at the time the event occurred. Thus, when event 838 (a digg of "How to Make a USB Powered Alarm Clock"

by Bob) occurs, the digg count of the story is shown as 33. The next time the story is dugg, the updated score is shown, such as when event 840 occurs. If the digg events are happening sufficiently quickly that some of them are not displayed to Alice, she might see gaps between the scores. For example, if 50 diggs of the alarm clock story occur in the next few seconds, Alice may only be presented with the most recent digg and the updated total (e.g., 83 diggs).

Figure 8B:
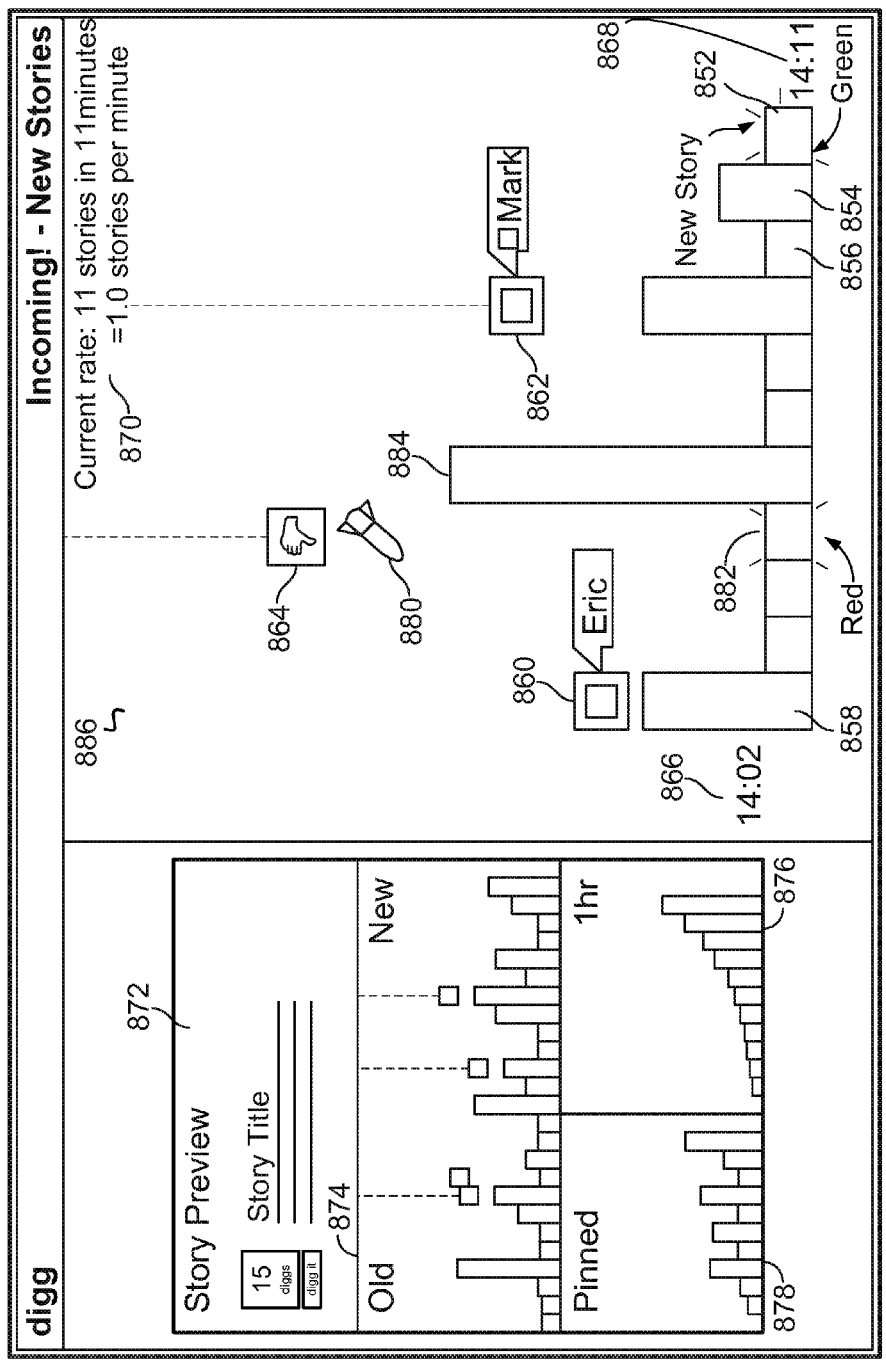
FIG. 8B illustrates an embodiment of a visualization interface.

FIG. 8B illustrates an embodiment of a visualization interface. The example shown is an implementation of a portion of website 116 as rendered in a browser being used by Alice. In this example, interface 850 (also referred to herein as a "stack" interface/visualization) is configured to present a visualization of newly submitted stories. After a new story is submitted, such as through the submission interface described in conjunction with FIG. 3, it is represented in interface 850 as a green square falling from the top of the screen and landing at the bottom. Any stories already existing on the page (e.g., 858, 882, 856, 854) are shifted to the left to make room for the new story (852). In some embodiments, stories are removed from the left side to make space for stories on the right side. In other cases, the width of the stories shown decreases to accommodate more stories as they are added to the interface. The length of time that a user has been viewing interface 850 is shown here as a timeline, with the time that Alice first started viewing interface 850 on the left (866) and the current time on the right (868).

In the example shown, eleven new stories have been submitted since Alice began viewing interface 150. Statistical information such as the number of stories submitted, the rate with which they are being submitted, etc., is indicated at 870. As preference events associated with the stories displayed in interface 850 occur, they are also indicated in interface 850. For example, when a story is dugg, the event is represented by a digg icon, such as the one shown at 812 in FIG. 8A falling from the top of the screen and onto the heap of the corresponding story, increasing the size of the heap if it is a digg and decreasing the size of the heap if it is a bury. For example, at 860, a digg of story 858 is shown falling down onto the story's graphical representation and will increase the height of the story box when it lands. A variety of indicators, such as colors and avatars can be used to indicate the occurrence of preference events in addition to or instead of the icons shown in FIG. 8A.

At 864, a bury of story 882 is shown falling down onto that story's graphical representation and will decrease the height of the story box when it lands. In the example shown, the bury is indicated by the bury icon shown at 814 in FIG. 8A. The identity of the user burying the story is not shown (as it can be in the case of other preference events), but by hovering her mouse over bury 864, Alice is shown a dialogue that includes the reason that the bury was submitted (e.g., "spam").

In some embodiments, additional elements are included, such as the animation shown at 880 (of a missile about to strike heap 882), and indications of who is taking the action. For example, diggs 860 and 862 are being performed by friends of Alice. She is alerted to this fact by bubbles accompanying the digg action being performed that indicate their names and/or avatars. The look of interface 850 can be skinned in some embodiments—Alice can specify that she desires the interface to have a militaristic theme, such as in the example shown, or other themes, such as ones in which animals "eat" stories or multiply.

The relative popularity of newly submitted stories is indicated by the relative heights of the stories shown in interface 850. For example, story 884 is a very popular story, while story 856 is not.

In the example shown, only newly submitted stories are shown. Interface 850 can also be scoped to represent other portions of activity. For example, Alice can specify that she wants to observe only actions taken by her friends (or groups of her friends), but across all stories, new or old. Alice can also specify that she wants to observe only actions that include a particular keyword, actions occurring only in particular categories or subcategories, etc. Alice can also specify particular stories she wishes to monitor, such as by selecting a link on the page's permalink that reads "add this story to my incoming view." Alice can also "pin" the stories shown in interface 850. When she hovers her mouse over a particular story shown in interface 850, one element that is revealed is a pushpin icon which, if selected, causes the story to remain in region 886 of interface 850, and/or be added to a list of favorites (878).

A variety of graphical tools are shown on the left hand side of interface 850. They include charts of information such as which stories in the last hour have been most popular 876, the relative rankings of stories that Alice is monitoring (has pinned) 878, a more comprehensive view (i.e., including information predating Alice's current interactions with interface 850), etc. At 872, the story entry 170 of a story that Alice hovers her mouse over, such as story 854, is displayed and she can interact with the story entry 170 such as digging it or burying it accordingly.

Figure 8C:
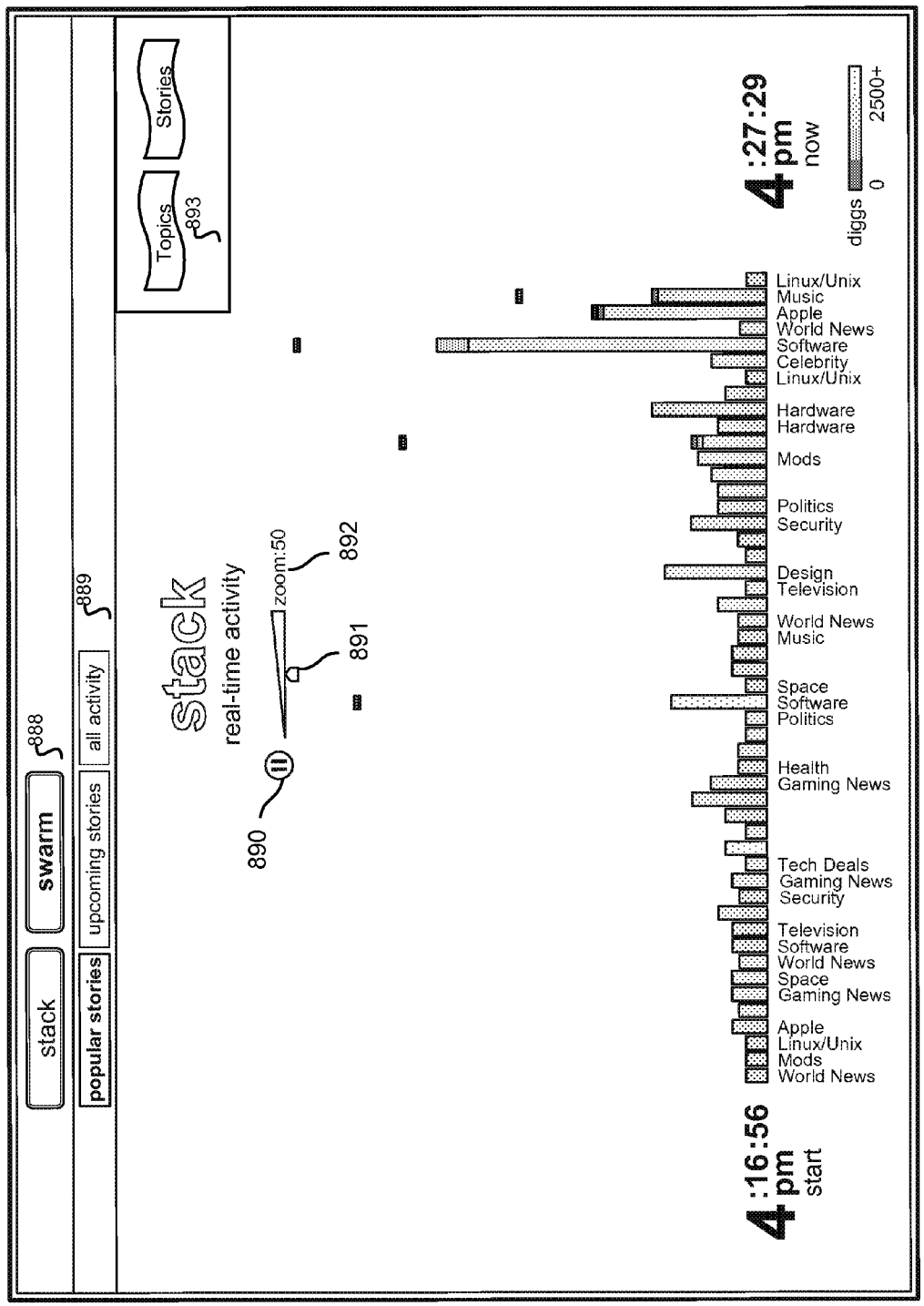
FIG. 8C illustrates an embodiment of a visualization interface.

FIG. 8C illustrates an embodiment of a visualization interface. In the example shown, a user may switch between different visualization styles (e.g., implementations of "stack" and "swarm") by selecting among choices provided in region 888. The visualization shown in FIG. 8C has multiple modes which can be selected from in region 889. When "all activity" is selected, all preference events occurring in all areas are included in the visualization. When "popular stories" is selected, stories that have been promoted to the front page are shown, arranged in the order in which they were promoted. When "upcoming stories" is selected, the most recently submitted stories are shown. In some embodiments, information such as a color scale is used to help depict when newly submitted stories have associated preference events. For example, if a newly submitted story has twenty or more diggs, the representation of the story may be colored bright red, indicating that the story is rapidly gaining interest.

The interface shown in FIG. 8C also includes a region 893 in which a user may select between seeing a visualization depicting the activities associated with individual stories (by selecting "Stories") and a visualization depicting the aggregated activities associated with the categories to which stories are assigned (by selecting "Topics"). In the example shown in FIG. 8C, the "Topics" view is selected and the preference events being visualized are relative to the topics rather than individual stories.

The interface shown in FIG. 8C also includes pause (890) and zoom (891) controls. The current amount of zoom is indicated in region 892. By using zoom control 891, groups of stories (e.g., the most recent stories) can be focused on, or the visualization can be pulled back for a broader view. Pause control 890 can be used, for example, to assist in more readily focusing on a specific story when a great deal of activity is occurring and the visualization would otherwise change rapidly. When in the "popular stories" mode (889), the zoom control can be used as follows. If the visualization is zoomed all the way out, the user is able to see the n most recently promoted stories, and get a sense of which stories continue to have a significant amount of associated preference events, even if they are no longer on the front page. The visualization provides information on which stories are active, even if they were not recently submitted. The value of n can be configured by the user and/or by a site administrator. An example default value of n is 100.

Figure 8D:
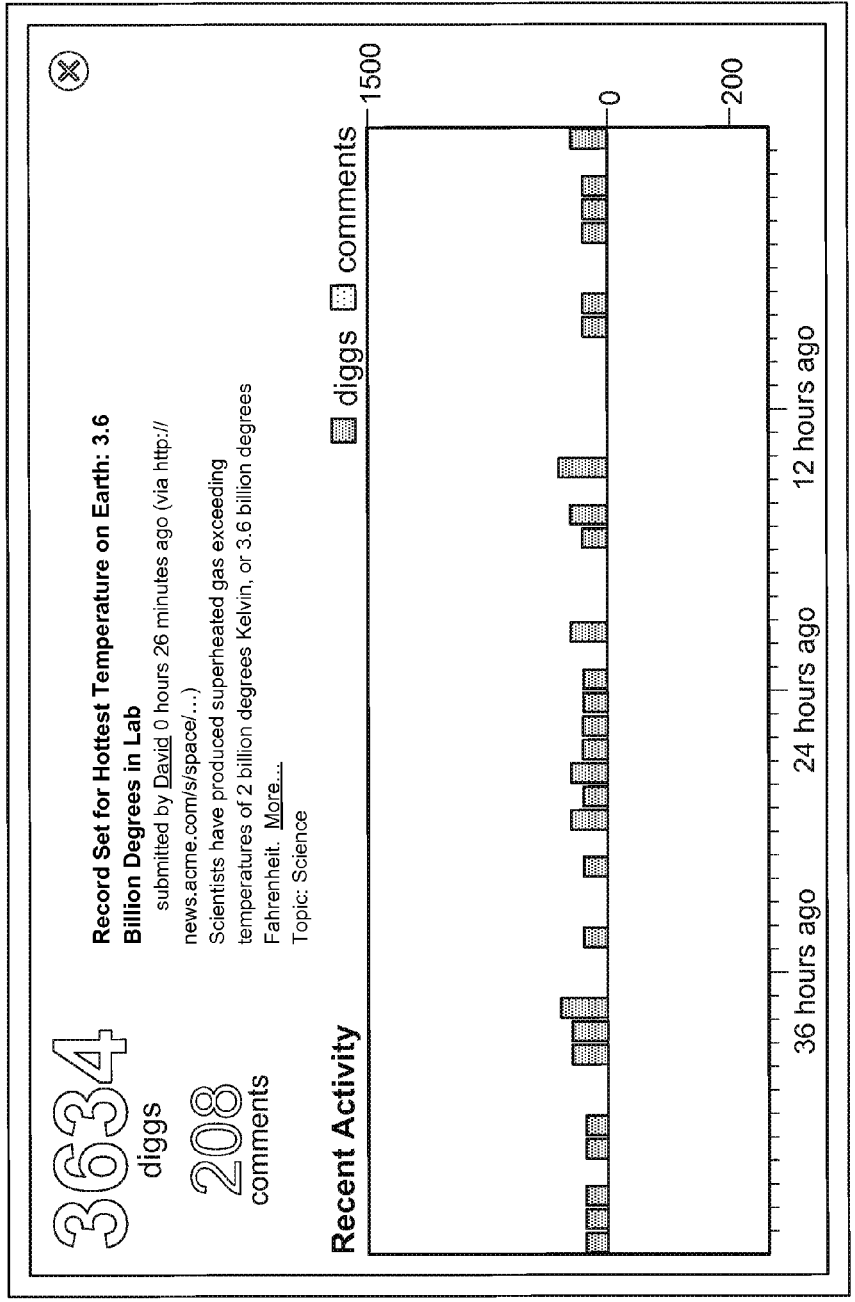
FIG. 8D illustrates an embodiment of a visualization interface.

FIG. 8D illustrates an embodiment of a visualization interface. In the example shown, Alice has selected a story from a stack visualization interface, such as by clicking on one of the stacks shown in FIG. 8B (e.g., 884, 856). In doing so, Alice is presented with additional information about that story, such as who dugg it, how many comments it has, etc. Links to the permalink page, etc., are also provided. In the example shown in FIG. 8D, a sparkline-style graph is also provided that shows a more detailed hour-by-hour display of activity on that story, including the frequency and magnitude of preference events. In various embodiments the information in interface 894 is configurable. For example, while a default view may show the last 48 hours of activity, the user (or an administrator) may be able to specify additional ranges, and/or the default range may be selected based on how much activity associated with the story has occurred. For example, a story with a lot of recent preference events may default to a 12 hour range, while an old story may show a histogram of all activity over all time.

Figure 9:
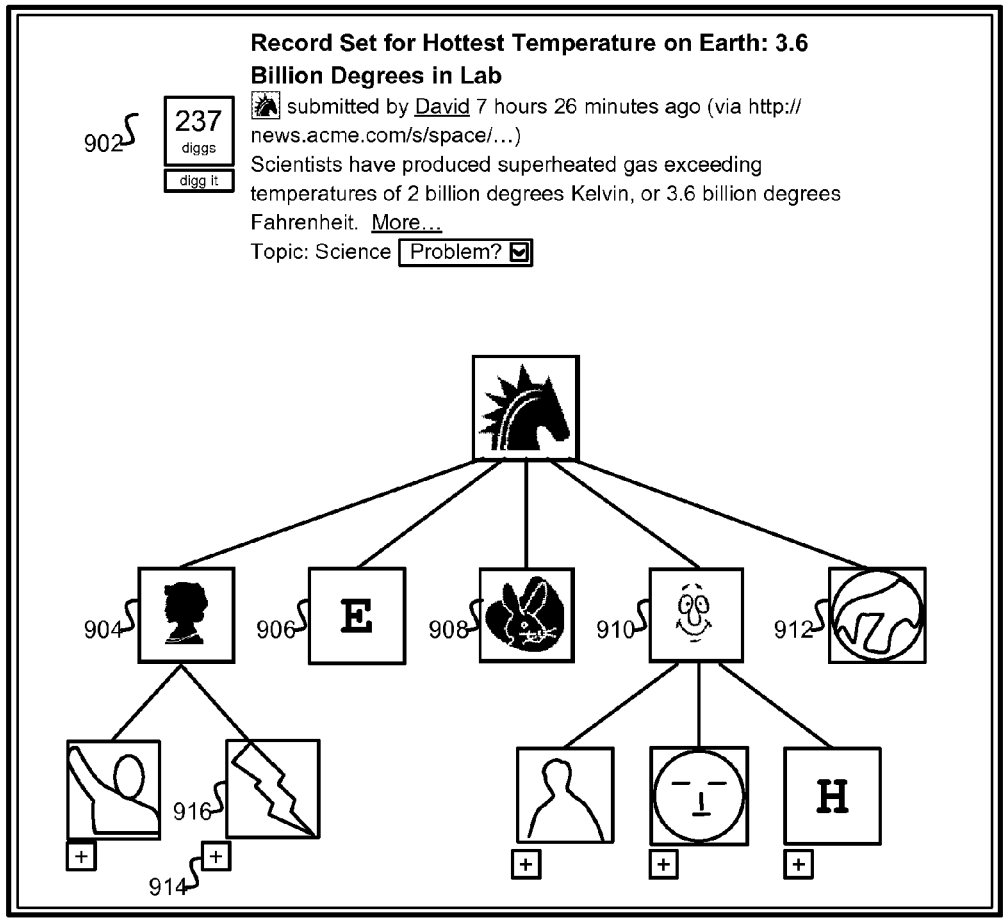
FIG. 9 illustrates an embodiment of a visualization interface.

FIG. 9 illustrates an embodiment of a visualization interface. The example shown is an implementation of a portion of website 116 as rendered in a browser. In this example, interface 900 is configured to present a visualization of the genealogy of the diggs (also referred to herein as a "tree view") of a story on preference system 102.

In the example shown, story 902 was originally submitted by the user David. When he successfully submitted the story, it appeared in his profile, as well as in the Friends History (e.g., at 610 of FIG. 6A) of the several people who have listed David as their friend. Suppose ten people have David as a friend, including users 904, 908, and 912 and seven users not pictured. After David submitted the story, friends 904, 908, and 912 dugg story 902, either through their own friends' pages or through David's profile. They are displayed in interface 900 as connected to David. Users who have David listed as a friend who did not digg the story are not displayed in interface 900. Users 906 and 910 do not have David as a friend, but dugg the story through visiting his profile. As a result, they are also shown connected to David.

When users 904-912 dugg story 902, that action was recorded in their respective user profiles as well. Visitors to their profiles, and those who list them as friends who digg the story will be shown connected to them, the way they are shown connected to David. If expansion tab 914 is selected, interface 900 will continue to provide detail down the tree (those who dugg story 902 through user 916, and so on).

One use of the tree view is that users can trace how their friends learned about stories and meet new friends. For example, if Alice notices that Bob diggs a lot of cryptography stories, she can determine where Bob diggs them from—does he submit the stories himself, or is he mainly digging stories submitted by CharlieB—and add new friends (such as CharlieB) as appropriate.

Figure 10:
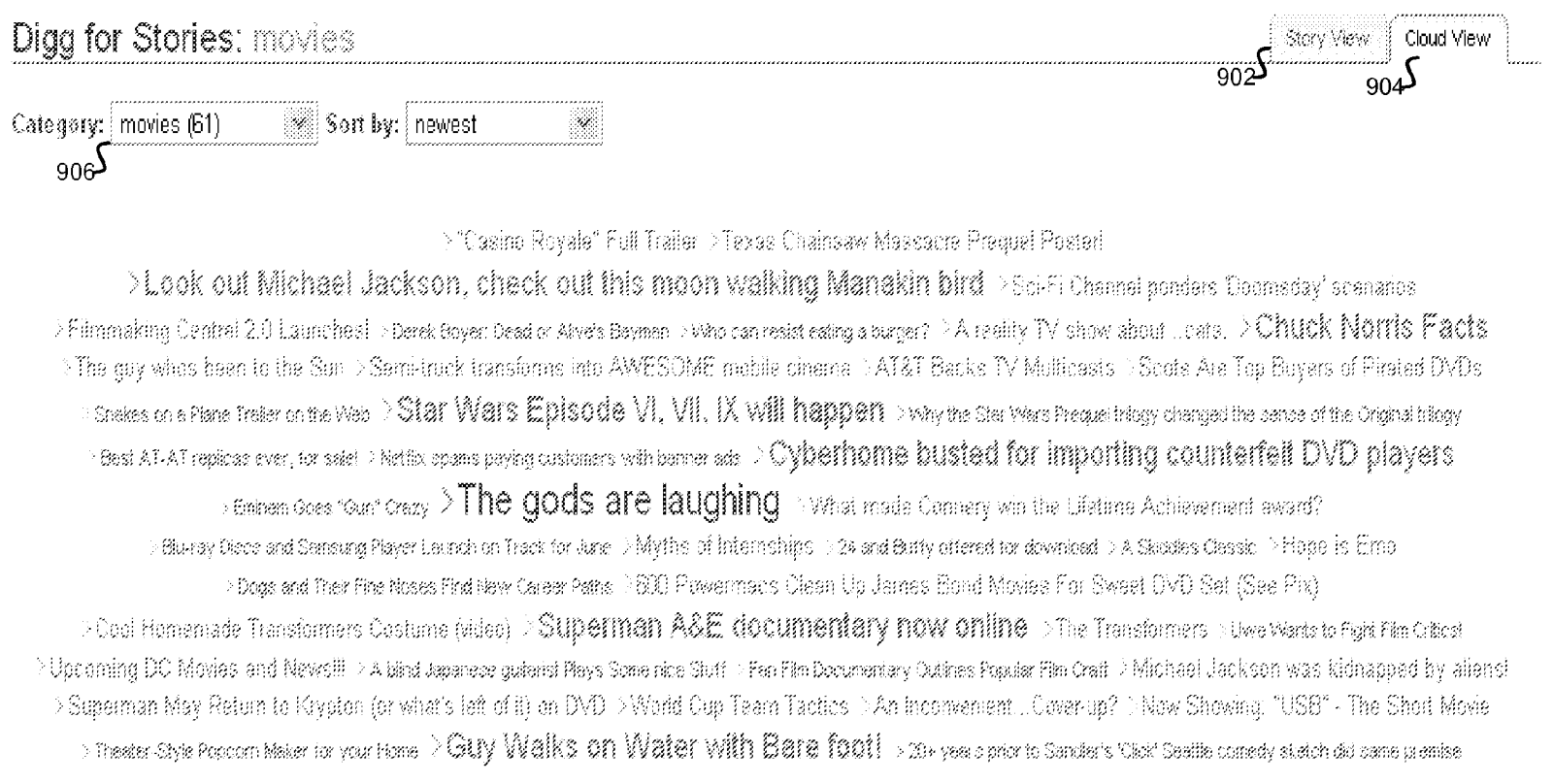

FIG. 10 illustrates an embodiment of a visualization interface. The example shown is an implementation of a portion of website 116 reached by selecting region 186 of FIG. 1B as rendered in a browser. In this example, Alice is viewing upcoming stories, which may be displayed in a variety of ways. If she selects region 902, Alice will be presented with upcoming stories in a format similar to that shown in the story window 164 shown in FIG. 1B (including one or more story entries 170). In the example shown, Alice has selected to view the upcoming stories in a cloud view by selecting tab 904. In this view, the title of each story in the upcoming queue is visualized as a function of the number of diggs it has. Stories with few diggs are shown in a very small font, and may be colored in a subtle manner, such as by being displayed in grey. Stories with many diggs are shown in a very large font and may be displayed in another color, such as red or black. Stories dugg by friends are also shown in a different color, such as green, irrespective of number of diggs. In some embodiments, additional information is received from the interface shown in FIG. 10 by taking an action such as hovering a mouse over a story title. In such case, information such as the current digg score of the story, which if any friends have dugg the story, and/or the story entry 170 of FIG. 1B is shown.

Which stories will appear in the cloud view can be configured, such as by selecting one or more categories to view or limiting the view to stories dugg by friends. The cloud view can also be sorted by a variety of factors. As shown, the newest (most recently submitted) stories are shown at the top, and older stories are shown at the bottom of FIG. 10. If the stories were sorted by most diggs, then stories rendered in the largest font would appear first and stories rendered in the smallest font would appear last. Other sorting methods may also be used, such as by sorting by most or least comments.

Figure 11A:
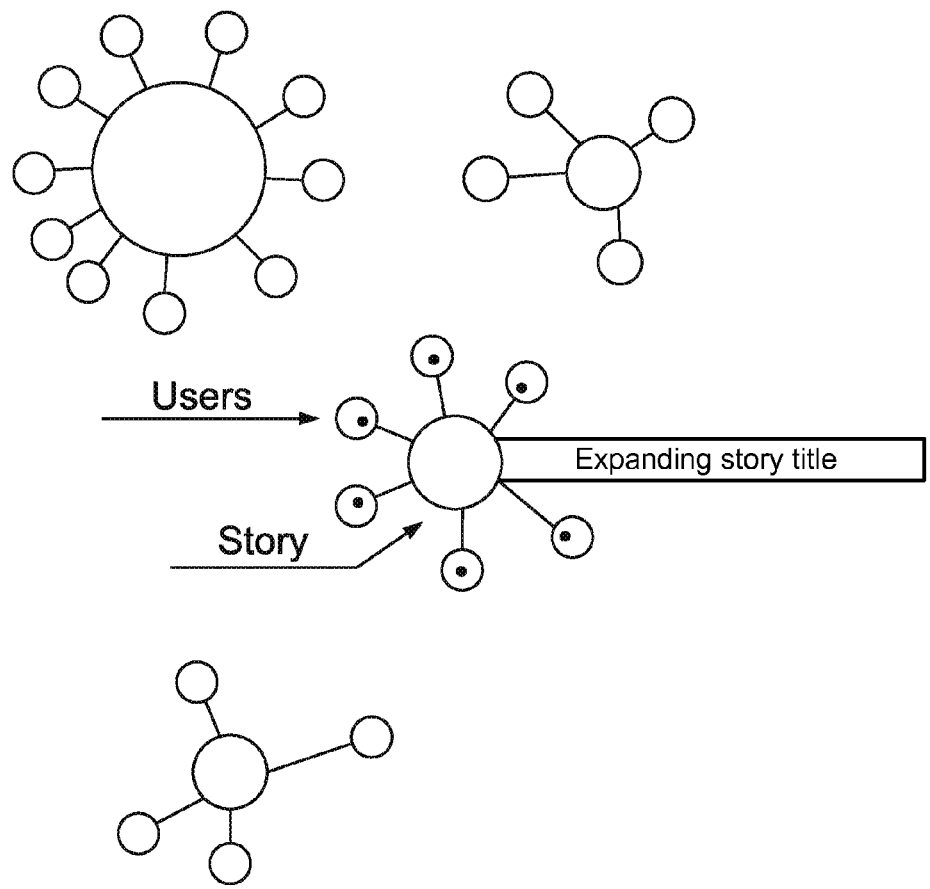
FIG. 11A illustrates an embodiment of a visualization interface.

FIG. 11A illustrates an embodiment of a visualization interface. The example shown is an implementation of a portion of website 116 reached by selecting the appropriate portion of region 188 of FIG. 1B as rendered in a browser, and is an example of a swarm interface (also referred to herein as a "swarm visualization"). In this example, Alice is viewing upcoming stories. Users are shown represented by their avatar icons or by more generalized shapes. As they digg a story, their icon is shown "swarming" around the story in real time—the avatar moves near the story the user is digging, as do the avatars of the other users currently digging the story. In some embodiments, the size of the user's avatar (or other representation of the user) increases and decreases based on the number of stories they are currently digging.

In some embodiments, only recent activity is shown—such as diggs in the last 10 minutes. Stories with more activities (such as diggs and comments) will appear larger than stories with fewer activities. In some embodiments, additional information is received from the interface shown in FIG. 11A by taking an action, such as hovering a mouse over a story title. In such a case, information such as the current digg score of the story, which, if any friends have dugg the story, and/or the story entry 170 of FIG. 1B is shown. The links between stories can also be shown, indicating, for example, that several of the same people that dugg a particular first story also dugg a second story, by connecting the two stories with a line. Indicators such as the color or width of the line can show how strong or weak the connection is between the stories.

Figure 11B:
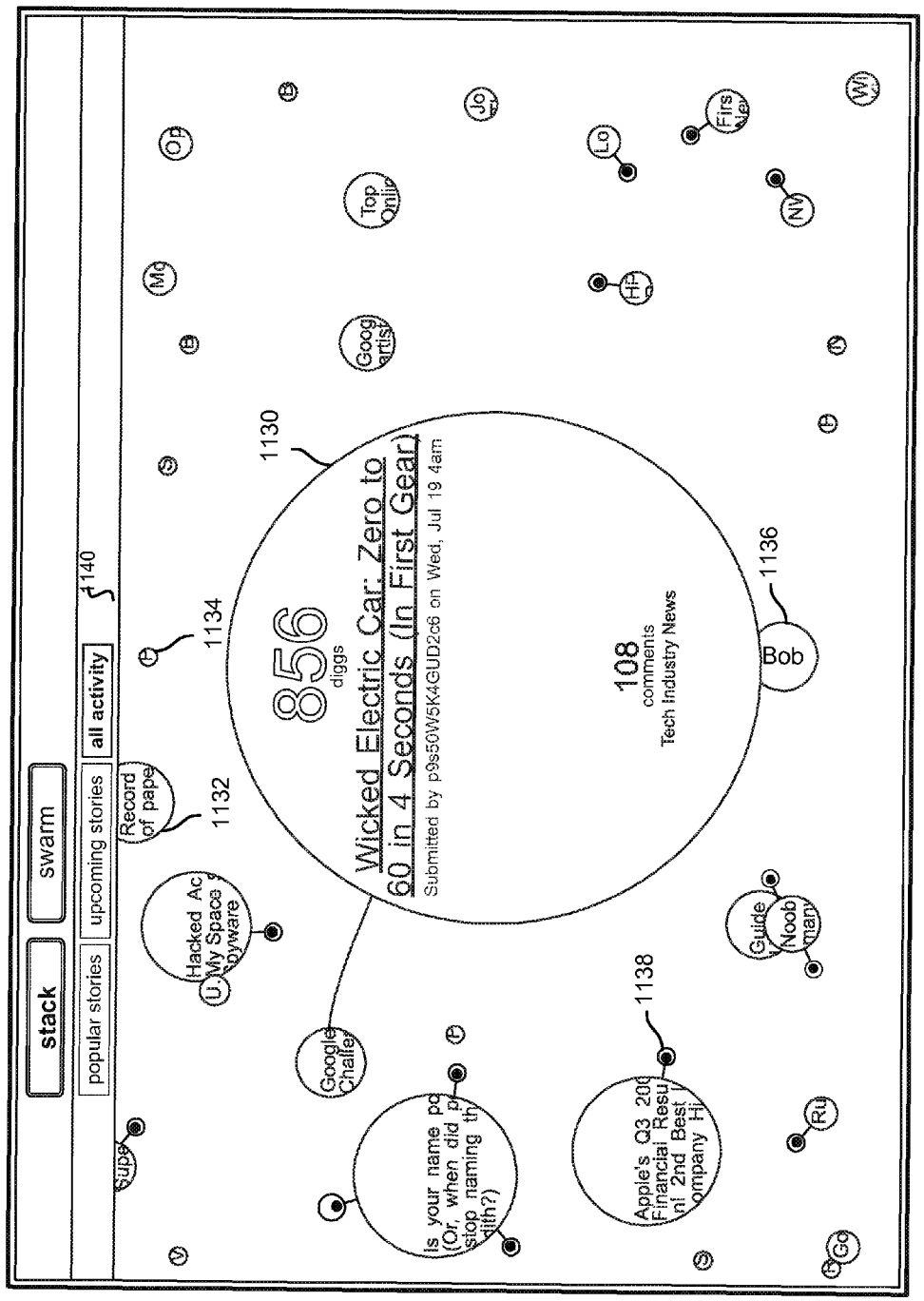
FIG. 11B illustrates an embodiment of a visualization interface.

FIG. 11B illustrates an embodiment of a visualization interface. The example shown is an implementation of a swarm visualization. In the example shown, stories are represented as circles, with the title of the story in the center of the circle. Users "swarm" around a story when they indicate a preference for the story, such as by digging it (and/or commenting on it, as applicable). Every time a story is dugg, the story's circle increases in size. Thus, the bigger the circle, the more active the story is. In the example shown, story 1130 is very popular, while story 1132 is less popular. Story 1134 has very few associated preference events.

As users digg more stories, they move from circle to circle, and also increase in size. For example, a very large user might represent a person who is not taking much time to read stories, but is instead merely rapidly indicating preferences. In the example shown in FIG. 11B, the user "Bob" (1136) has recently indicated preferences for many stories, while other users (e.g., user 1138) are less active. In the example shown, stories are initially randomly placed within the interface. As preference events associated with the stories occur, their positions change depending on who is digging (commenting, etc.) on them. For example, stories that are closer together indicate that they are being dugg by the same users, and by hovering a mouse over the story, such connections between stories are revealed.

Different modes of the swarm visualization may be presented by selecting one of the options in region 1140. For example, if the "all activity" is selected, circles representing stories and diggers are quickly removed from display if no associated preference events are occurring/being made, respectively. When the "popular stories" mode is selected, the display is initially loaded with the n stories most recently promoted to the front page. As new stories are promoted, they appear in the visualization, and the (n+1)th story is removed. The value of n may be configured, e.g., by a user or an administrator. In some embodiments n is 35. When the "upcoming stories" mode is selected, the n most recently submitted stories each receive a circle. In some embodiments n is 30.

Figure 11C:
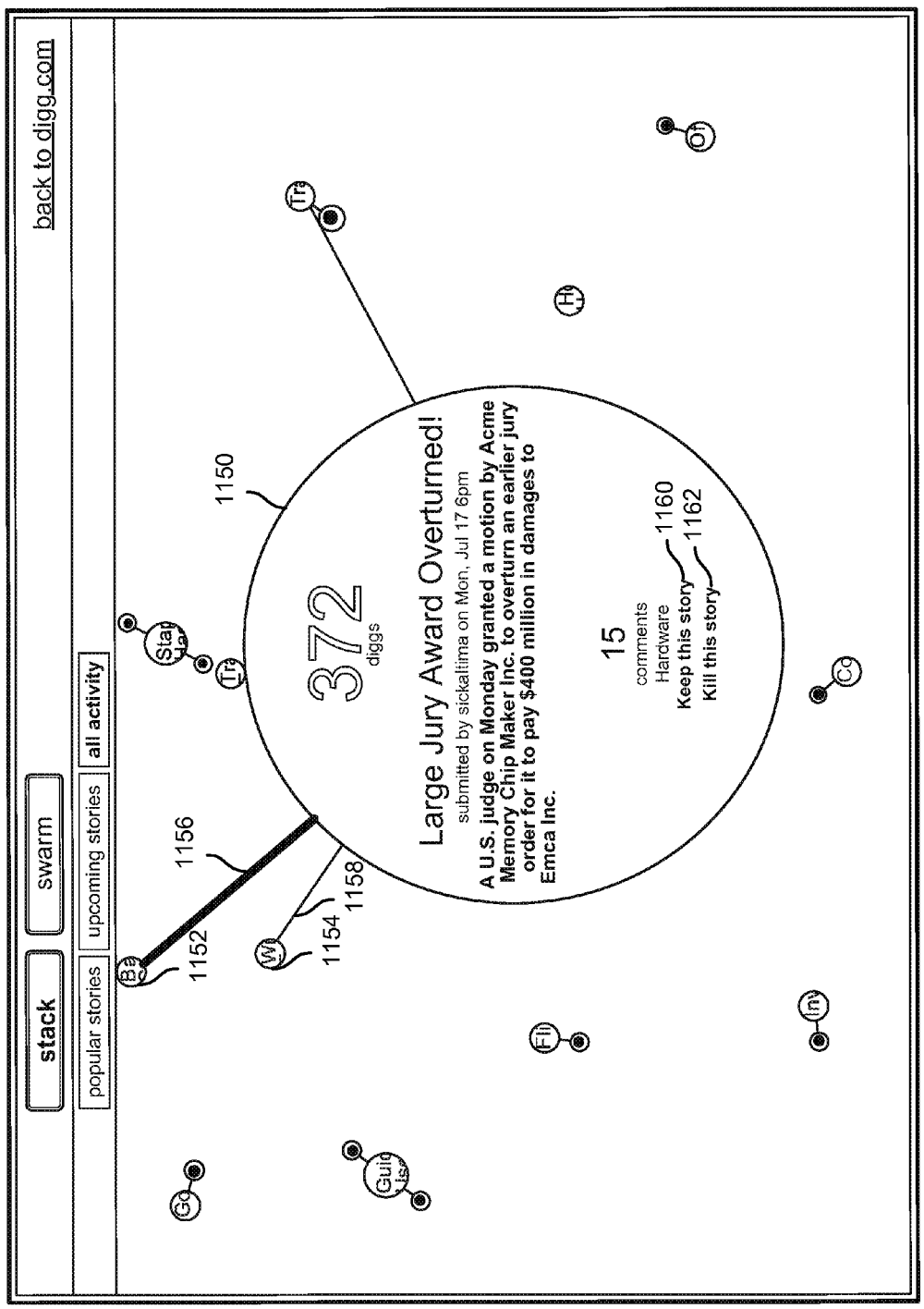
FIG. 11C illustrates an embodiment of a visualization interface.

FIG. 11C illustrates an embodiment of a visualization interface. In the example shown, Alice has selected a story from a swarm visualization interface, such as by clicking on one of the story circles shown in FIG. 11B. In doing so, Alice is presented with additional information about that story, such as who dugg it, how many comments it has, etc. Links to the permalink page, etc., are also provided.

In the example shown in FIG. 11C, the lines between stories indicate common diggers between those stories. The more diggers in common that a story has, the thicker the line. For example, stories 1150 and 1152 have considerably more common diggers (as indicated by line 1156) than stories 1150 and 1154 do (as indicated by line 1158).

Alice may also override the default amount of time a particular story will be displayed in (e.g., in the interface shown in FIG. 11B) by selecting either region 1150 or 1162 of the interface shown in FIG. 11C. Thus, for example, to prevent story 1150 from being removed when a new story is displayed, Alice may select region 1160. To immediately remove the story from the interface irrespective of when it might otherwise have been removed, Alice may select region 1162.

Additional Embodiments

In some embodiments, a plugin and/or add-on to a computer program product is used to provide digging (and/or burying, commenting, and submitting) functionality. The plugin/add-on is associated with an interface to server 102, which may include functions that determine whether a permalink already exists for the submission, and invoke processing of a new submission, a comment, etc., as appropriate.

For example, a plugin to a web browser (e.g., a Firefox extension) can be configured to offer a user the ability to digg an item directly from the context in which it is encountered without having to visit the submission interface described in conjunction with FIG. 3 or a permalink such as the one shown in FIG. 4A. For example, a notification embedded in a page or overlayed such as by the browser can indicate whether the page a user is currently browsing has been submitted as a story contribution yet. If not, a user can interact with the notification, such as by clicking on an interface that reads, "this page has not yet been submitted to digg.com, submit it now." Similarly, if the page has already been submitted, such as by a different user, the notification may take a variety of forms, such as an overlay of the current digg score (172) and a digg box, or a change, for example, in the background color, or some other element of the page.

Configurable dropdowns and/or overlays can also be provided to alert a user of certain activity. For example, the user can set an alert to receive notification when new stories having certain keywords are submitted to server 102. Notification can also be provided for friends' digging activities as they occur, such as that a friend has just dugg a story or commented on a product.

As used herein, content contributions are pointers to content (e.g., news articles and podcasts) that is stored outside of preference system 102, typically by a third party. In some embodiments, users submit the content itself (e.g., the full text of articles, and the audio file) rather than or in addition to a pointer to the content, and the techniques described herein are adapted accordingly. The terms "content," "content contribution" and "pointers to content" are used herein interchangeably. As described in more detail below, content contributions are not limited to news articles. Other content (such as products, services, songs, sounds, photographs, and video) can be submitted, dugg, buried and commented on, and the techniques described herein can be adapted as appropriate. Preference events taken on those types of content may likewise be associated with a profile and shared with friends in a manner similar to that described, for example, in conjunction with FIG. 6A.

Figures 12A, 12C:
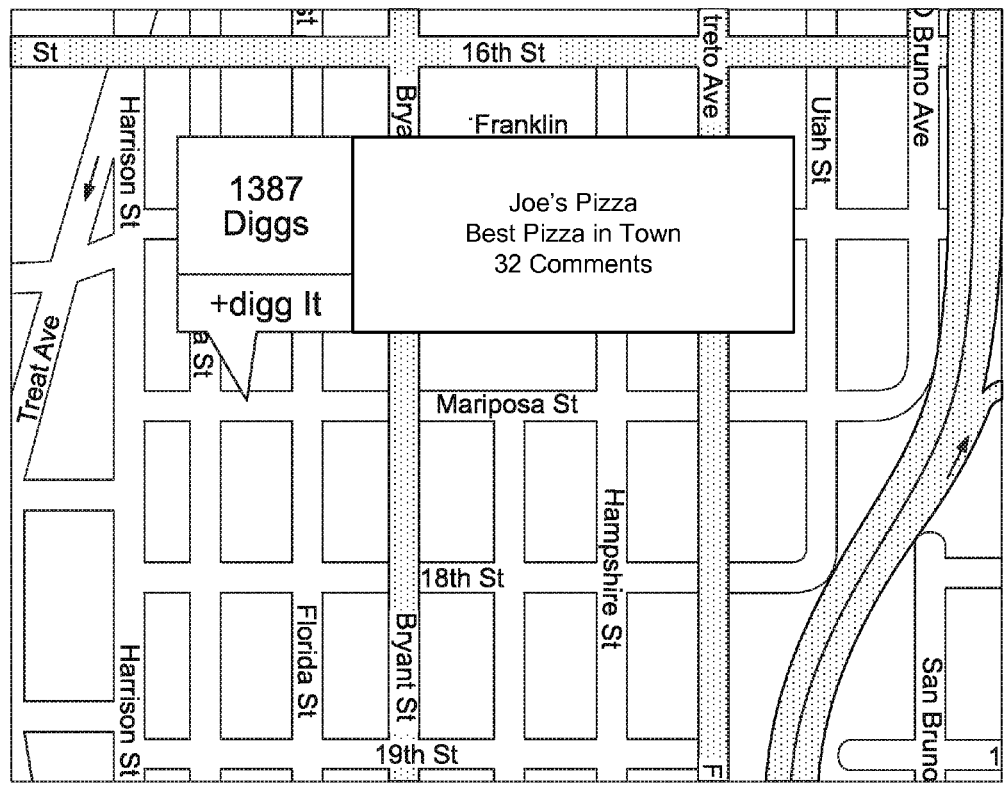
FIG. 12A is an example of a content contribution.
FIG. 12C illustrates an embodiment of an interface to a preference system.

FIG. 12A is an example of a content contribution. The example shown represents a restaurant submission. The name of the restaurant (1200) is included, as is information such as who submitted the restaurant, the URL of the restaurant, the type of cuisine it serves (1202), and the general location of the restaurant (1204). Users may perform such actions as searching for restaurants by cuisine type and/or location, and limiting results to ones having a threshold number of diggs. Restaurants having no or few diggs can be displayed as "upcoming restaurants," separated from "promoted restaurants" which have digg scores exceeding a threshold. Users can also supply additional information about their preferences for the reference, such as by supplying one or more tags (1202) that indicate attributes such as "ambiance" or signature dishes. As described in more detail below, which fields/tags are collected at submission time (and which, if any, can be added subsequently) and shown can be configured as appropriate depending on the type of content. For example, in the case of a product, a stock photo of the product may be included.

Figure 12B:
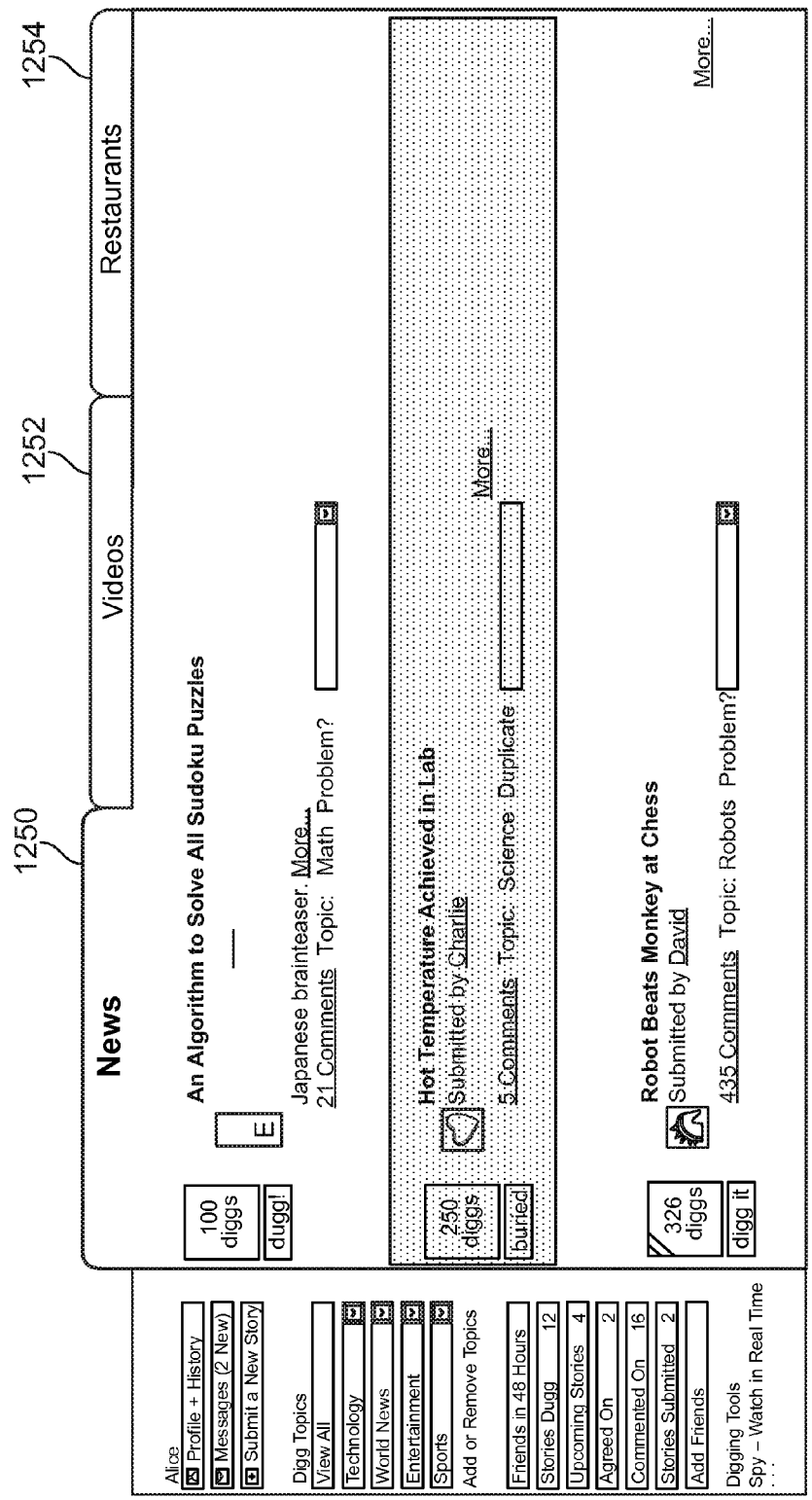
FIG. 12B illustrates an embodiment of an interface to a preference system.

FIG. 12B illustrates an embodiment of an interface to a preference system. In the example shown, the interface unifies a user's preference for things across multiple genres of content. For example, the user can digg for news (1250), videos (1252) and restaurants (1254) all through the same interface. As described in more detail below, the friends features described above can also be used in conjunction with other types of content contributions. For example, using the interface shown in FIG. 12B, a visitor to Alice's profile can learn which news stories she's been digging as well as learn which restaurants she diggs or doesn't digg. Similarly, Alice can customize the views of each of the tabs (1250, 1252, 1254) to display only restaurants her friends have agreed on, restaurants nearby (e.g., by selecting a region on a map or entering a ZIP code) that at least one friend has dugg, etc.

FIG. 12C illustrates an embodiment of an interface to a preference system. In the example shown, digging functionality has been combined with mapping functionality. When a user searches a map, such as a web-based map service, for nearby restaurants, entries on the map include an indication of the number of diggs a business has had and the ability to digg or comment on the business directly from the map interface.

FIG. 13A illustrates an embodiment of an interface to a preference system. The example shown is an implementation of a portion of website 116 which includes the ability to submit, digg and comment on products (including software), as rendered in a browser. In this example, Alice has selected to view products agreed on by her friends (1322).

Alice can submit a new product review by selecting portion 1302 of interface 1300. She can view products in one or more categories by selecting the appropriate portion of region 1304. Portion 1306 of interface 1300 displays the recent activities of Alice's friends in a dashboard format.

Region 1326 of interface 1300 indicates that four of Alice's friends have dugg product 1324, the ACME MP3 player. Alice can also see which of her friends have dugg product 1324 by hovering her input device over the digg score box of product 1324. In some embodiments, Alice can interact with region 1326, such as by being presented with a dialogue that offers to send an email to all of her friends listed in the region. In some embodiments, additional actions can be taken with product 1324. For example, Alice may be presented a "buy this product now" icon or link.

All of the views shown in FIG. 13A can be syndicated as RSS feeds by selecting RSS link 1320 on the appropriate page view. For example, if Alice is a professional critic, users and those who choose not to use web site 116 on a regular basis can syndicate comments that she makes on products, etc.

In some embodiments, profile visitors (including Alice) are presented with the option to search (1308) all of site 116 for product keywords (1310), search Alice's diggs for product keywords (1312), and/or search diggs made by Alice's friends for product keywords (1314). For example, a visitor to Alice's profile can search for MP3 players that she has dugg or commented on. In some embodiments, search interface 1308 includes the ability to filter results on meta information such as regions for DVDs, languages for books, etc. In some embodiments, views (and searches) can be limited by other factors, such as location (distance from Alice), availability (whether a product is in stock and how quickly it can arrive), etc.

Figure 13B:
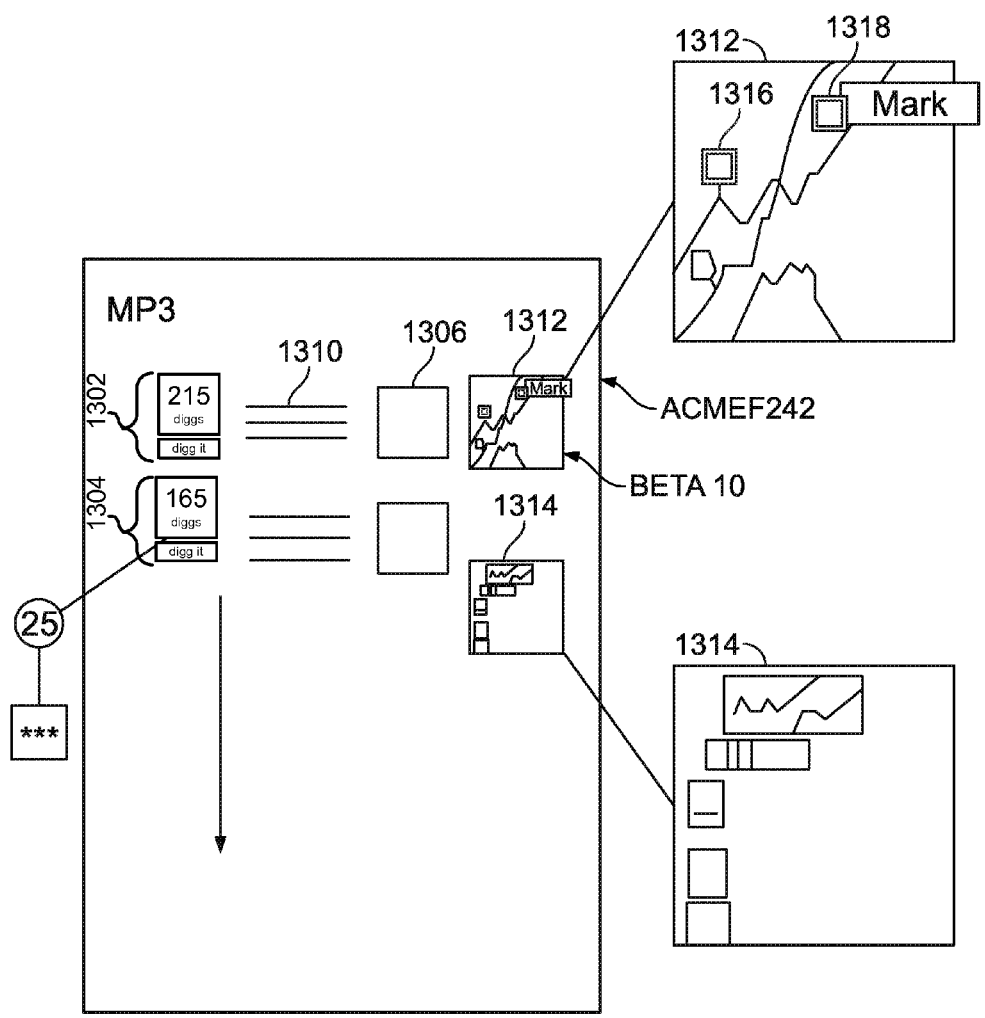
FIG. 13B illustrates an embodiment of an interface to a preference system.

FIG. 13B illustrates an embodiment of an interface to a preference system. The example shown is, as rendered in a browser, an implementation of a portion of website 116 that includes the ability to submit, digg and comment on products. In this example, Alice has selected to view products in the category, MP3 player, from a larger set of categories, such as those listed in region 1304 of FIG. 13A.

In the example shown, each product listing (1302, 1304) includes a photograph of the MP3 player (1306), as well as a digg score/digg box (1308), title, description, etc. (1310). The MP3 players shown in this example are sorted by popularity.

On the right hand side are assorted graphs (1312, 1314) of information associated with the products shown. Graph 1312 compares the popularity (e.g., digg scores, number of comments recently made) of different MP3 players against each other over time so that trends such as which ones are gaining in popularity and which ones are decreasing in popularity can be visually determined.

In the example shown, the Acme F242 player is more popular than the Beta 10 player. In some embodiments, the frequency with which a user visits preference system is considered when determining the popularity of a product. For example, suppose the Beta 10 player has 165 diggs, 25 of which were made by users who have not visited the preference system in 3 months. In some embodiments, the diggs of those 25 users are expired. The product will remain listed in the absent user's profiles, but their diggs will not be included when calculating the popularity of the product.

Users also have the ability to undigg a product to indicate that they've moved onto something new. For example, suppose Alice currently has a Beta 10 player and is interested in upgrading. If she purchases an Acme F242, she can visit her profile to undigg the Beta 10 and digg the Acme F242. Her actions—undigging the Beta 10 and digging the Acme F242 instead—will also be reflected in graph shown at 1312. For example, on the day that she undiggs the Beta 10, its position along the vertical axis will be decreased. On the day that she diggs the Acme F242, the Acme F242's position on the graph will similarly increase.

Graph 1312 also includes indications of the individual users who are taking digging and undigging actions. For example, when Alice hovers her mouse over region 1318, she can see that a user, Mark, dugg the Acme F242. Indications of actions taken by her friends are also included on graph 1312. For example, regions associated with friends' diggs of the Acme F242 are highlighted in green, or with avatars or other indicators that her friends have indicated preferences at a particular time. For example, Alice can use graph 1312 to determine that David dugg the Acme 242 two months after Charlie dugg the Beta 10.

The information shown in FIG. 13B can also be generated based on one or more searches in addition to or instead of tabbed browsing. For example, Alice could perform a search of "popular MP3 players at least one of my friends owns" and see the information shown in FIG. 13B as a result.

In some embodiments, demographic information is displayed. For example, in graph 1314, the popularity of a particular MP3 player is broken down by assorted groups such as teens and adults, or girls and boys. Demographic information can similarly be included in a search so that, for example, a parent shopping for a present for his or her child can locate the "hottest MP3 players among teenagers this week," and the "most popular movie for women aged 20-30," through a search interface configured to accept such queries.

Figure 14:
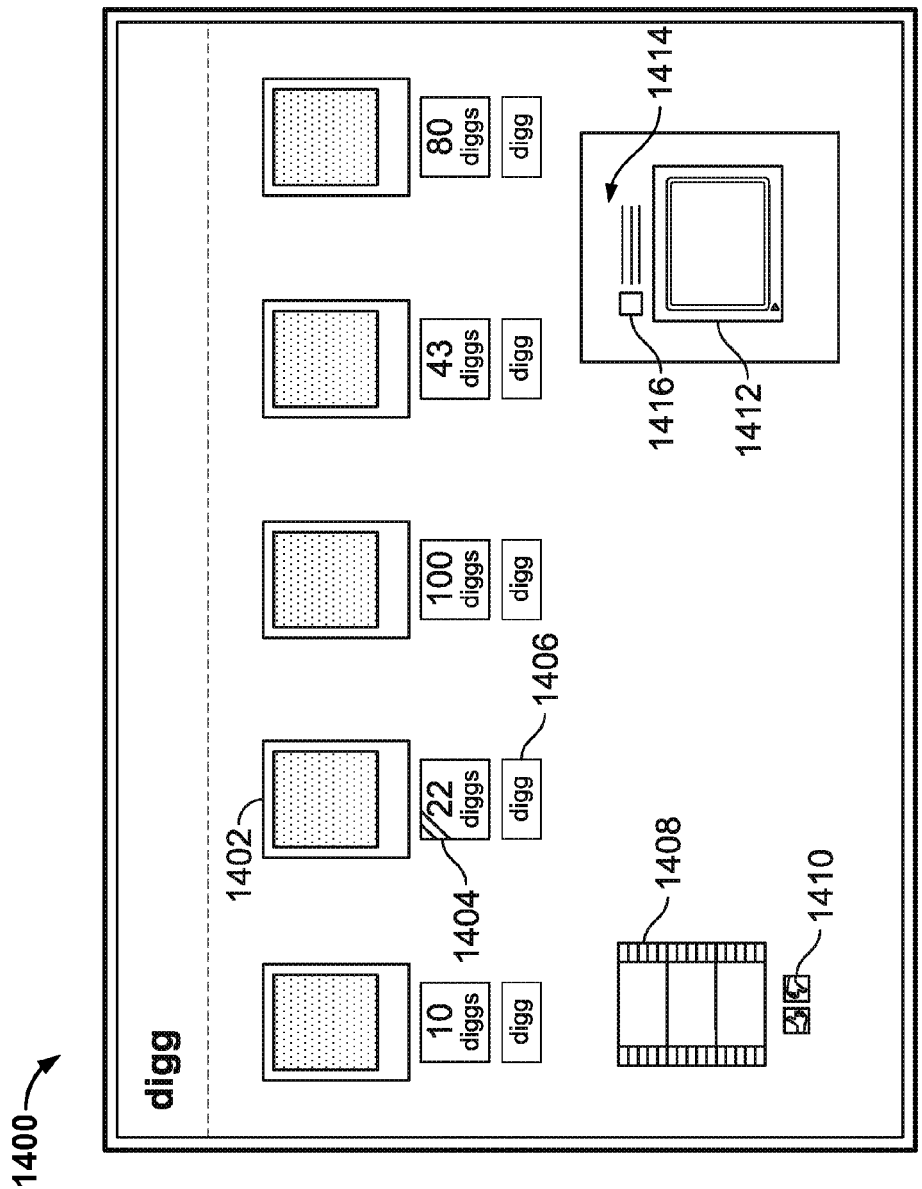
FIG. 14 illustrates an embodiment of an interface to a preference system.

FIG. 14 illustrates an embodiment of an interface to a preference system. The example shown is an implementation of a portion of website 116 which includes the ability to submit, digg and comment on photographs and video, as rendered in a browser. In the example shown, photograph 1402 was dugg by a friend, as indicated by banner 1404. By selecting digg box 1406, a visitor can indicate a preference for the photograph shown. In some embodiments, visitors indicate their preference for content such as video 1408 by selecting an icon such as icon 1410.

The content shown in interface 1400 can be presented in a variety of ways. For example, video content may be represented as an icon, such as the filmstrip icon shown at 1408. A screen shot of the first frame of the video may also be shown, and interactions such as hovering a mouse over region 1408 could trigger actions such as causing the video to be played in the browser.

In some cases, it may not be possible to embed the content directly into the interface shown in FIG. 14. In such a case, the video is shown in a format similar to story entry 170 (1416), and a preview button 1414 is included. When preview button 1414 is selected, a video player 1412 automatically slides out in which the video can be displayed.

Permalink pages such as the one shown in FIG. 4A can be adapted for photograph and video content as appropriate, and users may comment, blog, and take other actions with respect to visual and other content (such as songs) as appropriate.

Audience Platform

Using the techniques described herein, a community is given an opportunity to pose questions (e.g., to individuals)—without the use of editors. In the following example, suppose that a featured guest (e.g., the politician, "Joe Smith") has already been selected as an interviewee. A permalink page for the interview is created, either manually by an administrator of system 102, or automatically, in a manner similar to the creation of the story permalink page shown in FIG. 4A, or as otherwise appropriate.

Figure 15:
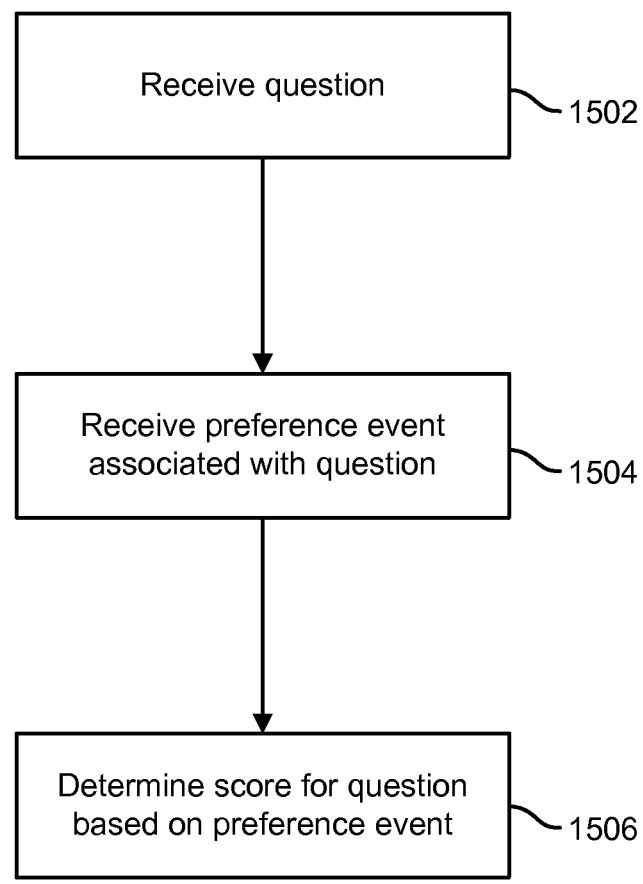
FIG. 15 illustrates an embodiment of a process for processing questions.

FIG. 15 illustrates an embodiment of a process for processing questions. In some embodiments the process shown in FIG. 15 is performed by preference system 102. The process begins at 1502 when a question is received. For example, a question is received at 1502 when a user of system 102 types a question into a text box, as described in more detail below. In various embodiments, processing such as checking for duplicates (and offering to show the user the existing question) and checking for offensive words is optionally performed. Questions can also be received from third party sources, such as via a third party website, an application, or other applicable source, such as through use of an API.

At 1504, a preference event (e.g., a digg or bury) is received for the question. At 1506, a score is determined for the question based on the received preference event. Once an appropriate triggering event occurs (such as a deadline being reached), a set of questions is automatically selected to be presented to the interviewee.

Figure 16:
FIG. 16 illustrates an embodiment of an interview permalink.

FIG. 16 illustrates an embodiment of an interview permalink. The example shown is an implementation of a portion of website 116 as rendered in a browser. Users are able to enter new questions for Joe Smith by providing them in region 1602 and selecting "submit." As with other content described above, users are able to digg/bury/comment on previously submitted questions using the interface shown. Users are also able to indicate problematic questions (e.g., those that are inappropriate, duplicate, etc.). Information about Joe Smith, such as his picture and a short biography is included. Also included in the interface shown in FIG. 16 is an indication that the interview with Joe Smith is sponsored by "Newspaper News Corp." In various embodiments, sponsors (e.g., promoting an upcoming movie, a political candidate) are able to pay (e.g., the owner of system 102) to have a specific individual or group of individuals interviewed. Advertisements promoting the interview (and, for example, directing those that click on advertisements to the interview permalink page) can be purchased and placed within site 116 and also on third party sites as applicable.

In various embodiments, questions can also be submitted in other formats. For example, an alternate version of the interface shown in FIG. 16 includes an additional box in which users may provide a URL (leading to an audio or video file that represents their question), a location of a file on disk, or audiovisual capture functionality (e.g., to capture audio from a computer microphone). If audiovisual questions are submitted, system 102 processes the data and makes it available to other users so that they can view/listen to the questions, and can provide transcripts for others. In some embodiments, transcripts of audiovisual submissions are automatically made (e.g., using third party transcript services). If audiovisual questions are among those ultimately selected for presentation to an interviewee, in some embodiments system 102 is configured to automatically package the audiovisual questions together and make them available to the interviewee, in some cases negating the need for a live host.

The interview permalink page shown in FIG. 16 includes an indication 1604 of when the question solicitation period will end. In this example, users have 1 day and 20 hours left to submit questions and/or to provide feedback on the questions posted by other users. In various embodiments, other rules can be used to end the ability of users to submit questions for consideration. For example, instead of relying on a time-based deadline, the receipt of a threshold number of questions (e.g., 100), the receipt of a threshold number of diggs, the receipt of a threshold number of diggs relative to a threshold number of questions (e.g., 20 questions, each having at least 100 diggs) or other triggering events can be used, as applicable. In various embodiments, the selection criteria are configurable. For example, if an interview is sponsored by an advertiser, the advertiser can specify that none of the selected questions be controversial, that none of the questions include offensive words, that none of the questions mention a competitor by name, etc. The sponsor can also specify that an additional "n" questions be included as alternates. For example, if the sponsor intends to ask 10 questions, the sponsor may specify that the top 15 questions be determined at the triggering event, to give the sponsor some flexibility in conducting the interview.

The interface shown in FIG. 16 allows users to customize their view of the interview permalink page. For example, they can choose to see all 827 questions, they can choose to see only the questions they have submitted themselves, and they can also elect to see questions submitted by their friends. By selecting various options in drop down 1606, users can elect to sort the questions in various ways, such as by newest first.

Figures 17A, 17B:
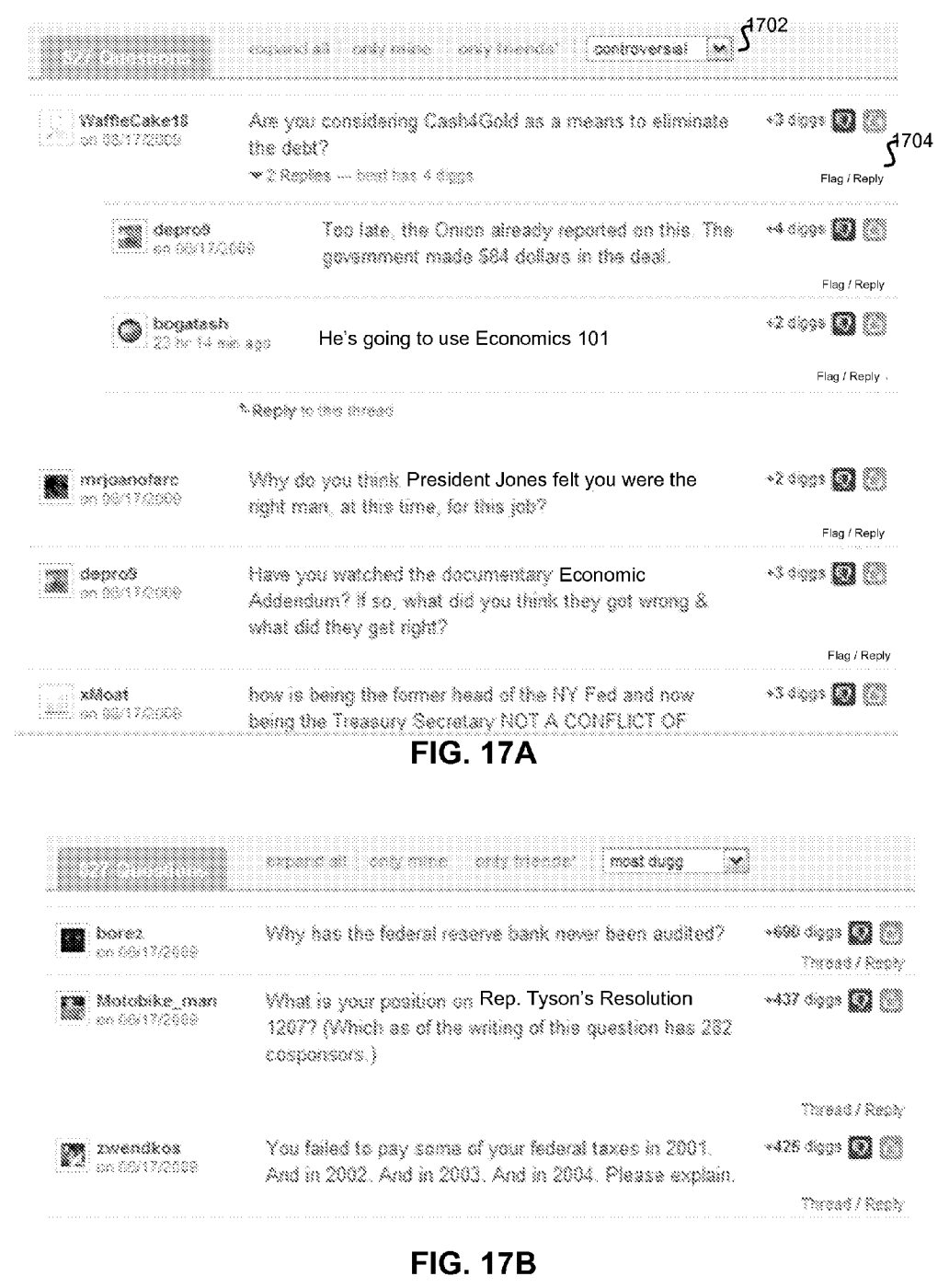

FIG. 17A illustrates an embodiment of a portion of an interview permalink. In the example shown, a user has elected to sort the questions by "most controversial" first (1702). These questions are ones for which a significant number of both positive (e.g., digg) and negative (e.g., bury) preference events have been received. In addition, FIG. 17A illustrates that users may comment on questions by selecting the "Reply" option 1704.

FIG. 17B illustrates an embodiment of a portion of an interview permalink. In the example shown, a user has elected to sort the questions by "most dugg" first.

As mentioned above, when a triggering event occurs (e.g., a deadline is reached), a subset of questions is automatically selected from the set of received questions based on received preference events. In some embodiments, the selected questions are those having the highest digg scores. In other embodiments, a mix of questions can be specified, to include the 10 most dugg questions and the 5 most controversial questions, for example. Other rules can also be specified, such as the 10 most dugg questions and the 5 most controversial questions that also have at least 100 diggs. A host then interviews the interviewee from the questions selected. In various embodiments, the interview is shown live (e.g., streamed on site 116). An archive copy of the interview and/or a text transcript are then made available on the corresponding interview permalink page for future visitors to that interview permalink page. In some embodiments, instead of a live, hosted interview, the interview questions are sent to the interviewee in text form and the interviewee responds, also in text form, and the results are automatically included in the interview permalink page. The selected questions can also be presented to the interviewee as part of a live text-based chat, facilitated by system 102.

Figure 18:
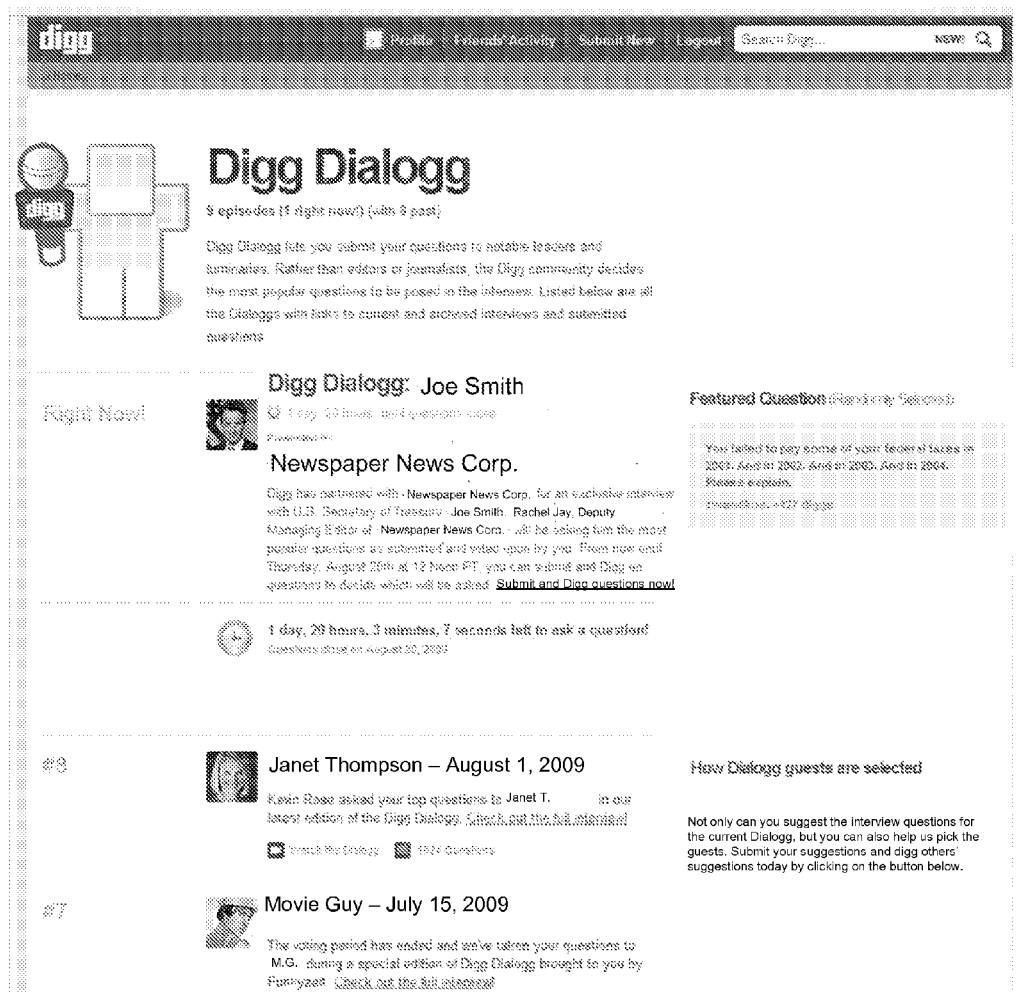
FIG. 18 illustrates an embodiment of a portion of an interface to a preference system.

FIG. 18 illustrates an embodiment of a portion of an interface to a preference system. In the example shown, a list of links to all interview permalink pages on system 102 is provided. Included in the list is the interview permalink illustrated in FIG. 16 (for which users may still provide questions) and completed interviews (for which users may view questions and comments, as well as read the interview transcript and/or watch the interview footage). In various embodiments, interview permalinks are indexed by category (e.g. politics for political interviewees, entertainment for movie stars) and/or are accessible via links such as are shown in region 160 of FIG. 1B.

In addition to an environment such as is shown in FIG. 1, the audience selection and preference features described herein can also be deployed in other environments, such as in a standalone fashion on a third party television station web page, on a third party newspaper web page configured to communicate with system 102, etc. For example, the editor of a well-known newspaper can use the techniques described herein to be provided electronically with top suggestions of what questions to pose to interviewees as part of a print-based interview. In such a scenario, the editor of the newspaper could have the appropriate functionality be provided by the newspaper's website and/or the newspaper's website could obtain portions of the processing service from system 102. For example, system 102 can be configured to include a custom module that allows the newspaper editor to manually specify deadlines, interviewees, etc., while still having system 102 allow users to contribute/comment on interview questions and automatically select the questions to be asked by the newspaper editor.

As yet another example, in some embodiments questions can be submitted via (and/or voted on) via a standalone application such as an application installed on a cellular phone. The cellular phone's microphone and camera (if applicable) can be used by the user to submit audiovisual questions, if desired. Submissions of and interactions with questions can also occur through the use of an API, browser plug-in, etc.

As mentioned above, in some cases the featured guest is selected by an editor or otherwise directly provided. In other cases, the target interviewee can also be selected using the techniques described herein. For example, users can be provided an interface into which they can submit the names of prospective guests. Other users can digg or bury their suggestions. Examples of prospective featured guests include leaders and other individuals across diverse topics including technology luminaries, environmentalists, politicians, scientists, entrepreneurs, musicians and filmmakers.

Figure 19:
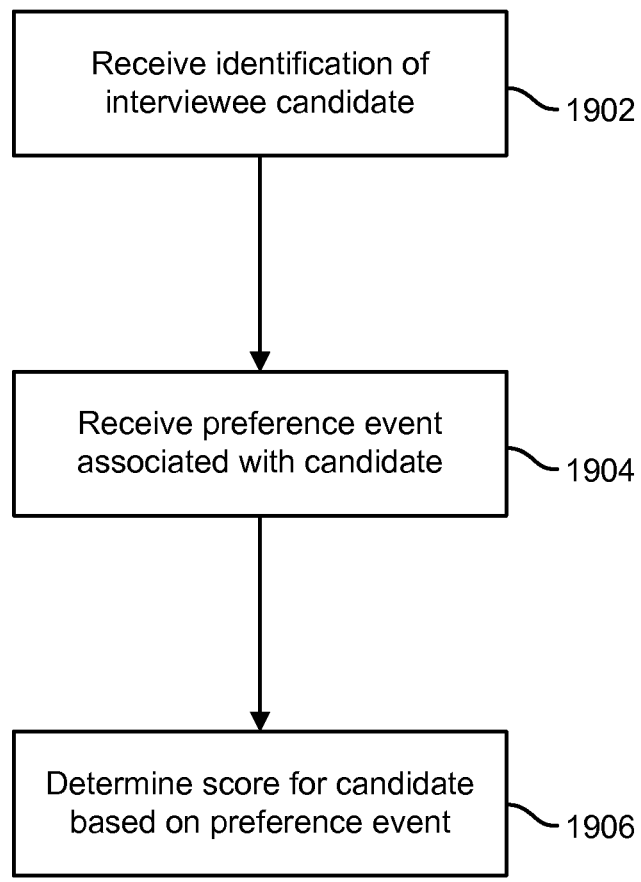
FIG. 19 illustrates an embodiment of a process for selecting an interviewee candidate.

FIG. 19 illustrates an embodiment of a process for selecting an interviewee candidate. In some embodiments, the process shown in FIG. 19 is performed by preference system 102. The process begins at 1902 when an identification of a candidate is received. For example, an identification is received at 1902 when a user of system 102 provides the name "John Johnson" into a submission form provided by system 102. Optionally, information about the candidate such as a category (e.g., scientist, celebrity), a representative URL for the candidate, etc., is also solicited on the form. Various processing such as checking for duplicates or disambiguating common names is optionally performed (e.g., by matching the supplied name against existing permalink pages and offering to direct the user appropriately). Identifications of candidates can also be received in other ways. For example, instead of or in addition to typing the name of the individual into a form, users can also provide URLs (e.g., to the candidate's official website, to a Wikipedia page about the candidate, to the candidate's social networking page) that are used to uniquely identify the candidate. Duplicate checking can be optionally performed on the supplied URLs, as applicable.

At 1904, a preference event (e.g., a digg or bury) is received for the candidate. At 1906, a score is determined for the candidate interviewee based on the received preference event. Once an appropriate triggering event occurs (such as a deadline being reached), an interviewee is automatically selected.

The process shown in FIG. 19 can be adapted to select interviewees, hosts, and groups/panels of interviewees and hosts as applicable. Additionally, the processes of FIGS. 19 and 15 can be combined. For example, in some embodiments when a candidate is identified at 1902, a permalink page for the candidate is created (if one does not already exist). If that candidate is selected as an interviewee, the permalink page for that candidate can be configured to automatically accept questions (and configured not to accept questions unless/until the candidate is selected as an official interviewee).

FIG. 20 illustrates an embodiment of a candidate selection page. The example shown is an implementation of a portion of website 116 as rendered in a browser. Users are able to indicate preferences for candidates (e.g., received at 1902 in the process of FIG. 19) by selecting region 2002. When the triggering event occurs (e.g., two days pass), the candidate with the most diggs is automatically selected for interview, and a permalink page corresponding to the candidate will automatically be configured to accept questions.

The techniques herein can be adapted to allow users to nominate candidate awardees (e.g., for best actress, best new single/album, best restaurant, product of the year) and also to provide preference feedback/comments on those award nominees.

Figure 21:
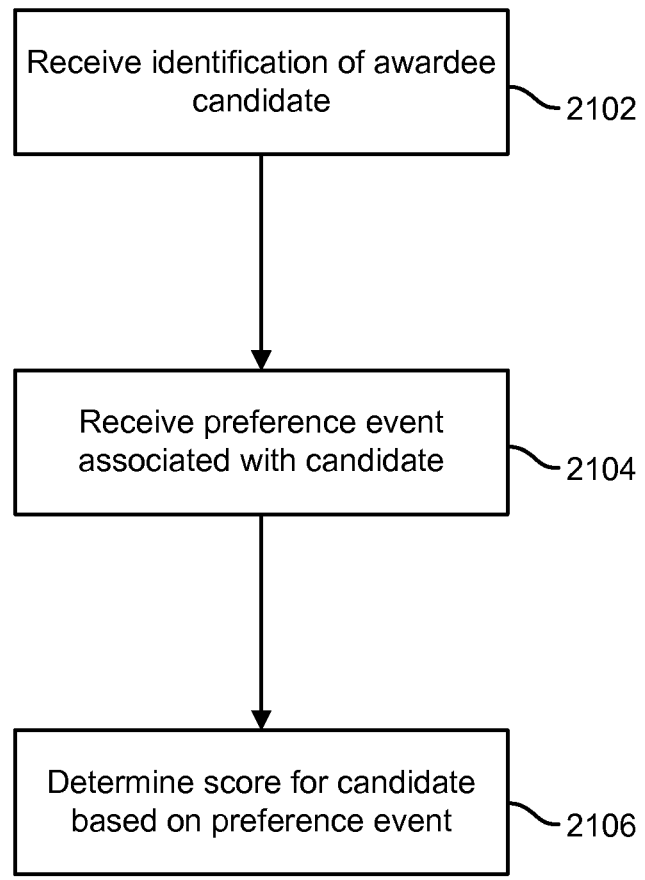
FIG. 21 illustrates an embodiment of a process for selecting an awardee candidate.

FIG. 21 illustrates an embodiment of a process for selecting an awardee candidate. In some embodiments the process shown in FIG. 19 is performed by preference system 102. The process begins at 2102 when an identification of a candidate is received. For example, an identification is received at 2102 when a user of system 102 provides the name of an actress, "Star Starlett," into a submission form provided by system 102. Optionally, information about the candidate, such as a category (e.g., best actress), a representative URL for the candidate, etc., are also solicited. Various processing such as checking for duplicates or disambiguating common names is optionally performed (e.g., by matching the supplied URL against information associated with existing permalink pages). Identifications of candidates can also be received in other ways. For example, system 102 can be configured to work in cooperation with a third party movie site which stores detailed information about movies, actors, directors, etc. Buttons placed on the third party movie site can be configured to automatically display appropriate messages such as "submit this actress" or "digg this actress's performance" based on whether or not the corresponding actress has already been identified at 2102.

At 2104, a preference event (e.g., a digg or bury) is received for the candidate. At 2106, a score is determined for the candidate awardee based on the received preference event. Once an appropriate triggering event occurs (such as a deadline being reached), an awardee is automatically selected.

Figure 22:
FIG. 22 illustrates an embodiment of a third party website.

FIG. 22 illustrates an embodiment of a third party website. In the example shown, a third party movie site ("ACME Movie Site") has been configured to work in cooperation with system 102 to allow users of the movie site to nominate actors (and actresses, films, directors, editors, soundtracks, etc.) for various annual awards, and also to provide preference feedback for nominees. By selecting region 2202, a user of the movie site is submitting an identification (received at 2102 of the process shown in FIG. 21) to system 102. If an identification for the actress has already been received, the message "digg my performance" or similar text would be displayed in region 2202.

In various embodiments, award categories (e.g., best actor, best director, best restaurant in New York) are manually configured by an administrator of system 102 or other appropriate party. Each category receives its own permalink page and users of system 102 can suggest winners/provide preference feedback through use of an interface similar to that shown in FIG. 16. For example, for a "best restaurant in NYC" award, users can submit restaurant names in a region similar to region 1602 and could digg or bury existing entries, sort by most controversial, etc., in an analogous manner to the techniques described in conjunction with FIG. 16.

Figure 23:
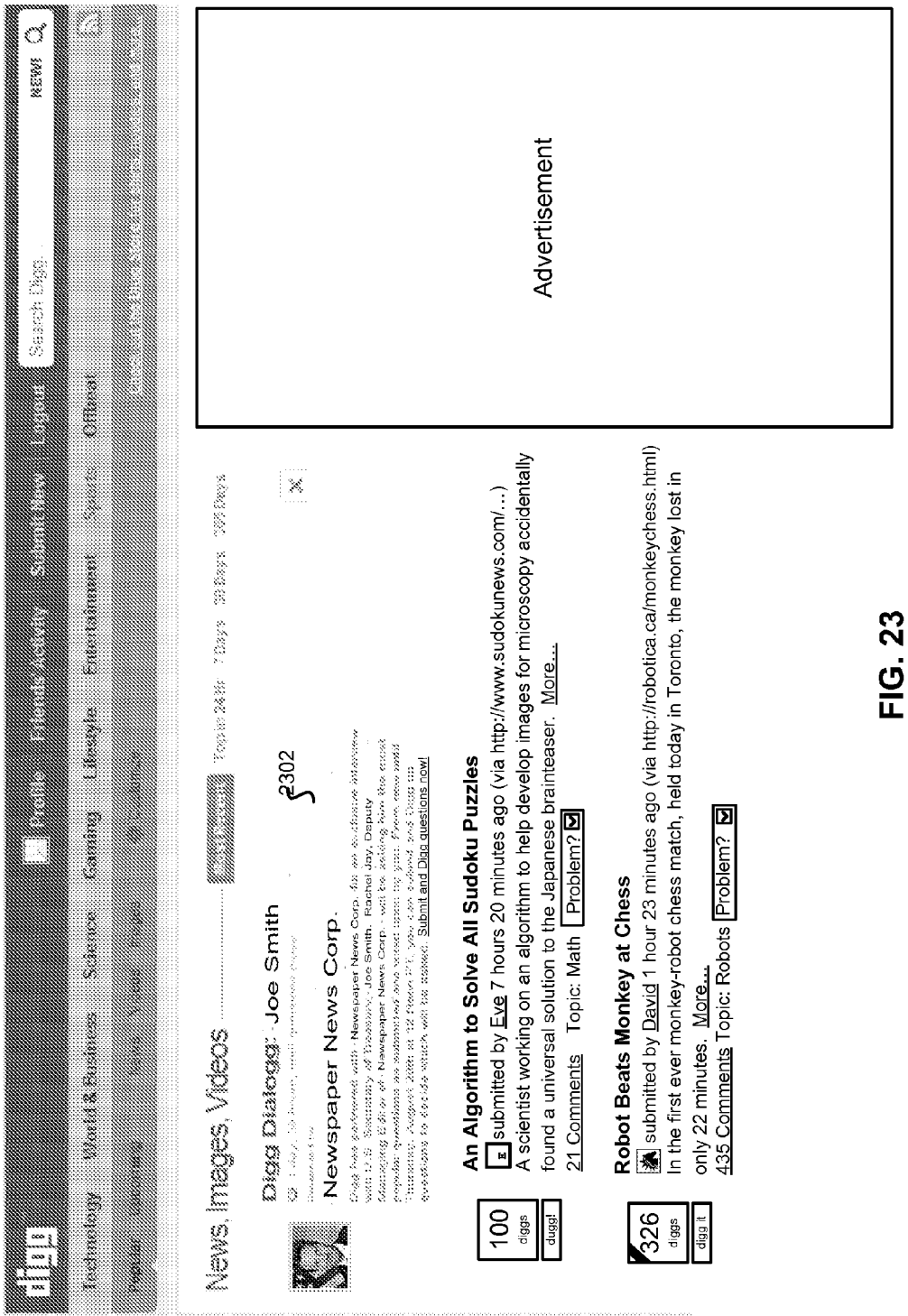
FIG. 23 illustrates an embodiment of an interface to a preference system.

FIG. 23 illustrates an embodiment of an interface to a preference system. The example shown is an implementation of a portion of website 116 as rendered in a browser. In the example shown, an indication that questions are currently being accepted for an interview of Joe Smith is displayed in region 2302, with other content contributions displayed below. In various embodiments, interview entries are automatically shown alongside recently "promoted" content when certain events occur with respect to the interview. For example, when the period for submitting questions opens, the interview permalink page is automatically "promoted" so that users of site 116 know that they are able to start asking questions. One day before the period for submitting questions ends, the interview permalink page is automatically "promoted" again so that users of site 116 know that they should get their questions in before the deadline. On the day of the interview, the interview permalink page is automatically "promoted" again so that users of site know that they can watch a live video feed of the interview, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      serve a web page identifying a selected interviewee; and
      during an interview with the selected interviewee:
         receive via the web page a first question directed to the interviewee;
         display the first question in the web page;
         receive from multiple viewers, as they view the web page, a first plurality of preference events associated with the first question;
         calculate a score for the first question based at least in part on the first plurality of preference events; and
         determine, based on the calculated score, whether to pose the first question to the interviewee; and
   a memory coupled to the processor and configured to provide the processor with instructions.

2. The system of claim 1, wherein the processor is further configured to:
   rank multiple questions received via the web page, including the first question, based on their controversy;
   wherein each of the preference events associated with the first question is one of:
      a positive preference for the first question; and
      a negative preference for the first question; and
   wherein the controversy of the first question is different from the calculated score and is inversely proportional to the difference between a total number of positive preferences of the first question and a total number of negative preferences of the first question by the multiple viewers.

3. The system of claim 1, wherein the score comprises a rank.

4. The system of claim 1, wherein at least one preference event is an indication of a positive preference.

5. The system of claim 1, wherein at least one preference event is an indication of a negative preference.

6. The system of claim 1, wherein the processor is further configured to receive, during the interview, an indication of a problem associated with the first question.

7. The system of claim 1, wherein the processor is configured to receive the first question as text data.

8. The system of claim 1, wherein the processor is configured to receive the first question as video data.

9. The system of claim 1, wherein the processor is configured to receive the first question as audio data.

10. The system of claim 1, wherein:
    the first question is received from a first web site; and
    the score for the first question is displayed on a second web site.

11. The system of claim 1, wherein:
    the first question is received from a first web site; and
    at least one preference event associated with the first question is received from a second web site.

12. The system of claim 1, wherein at least one preference event is received from a mobile device.

13. The system of claim 1, wherein the processor is further configured to:
    during the interview:
       receive a second question via the web page;
       display the second question in the web page;
       receive from the multiple viewers, as they view the web page, a second plurality of preference events associated with the second question; and
       rank the first question and the second question based on the first plurality of preference events and the second plurality of preference events.

14. The system of claim 1, wherein the processor is further configured to:
    during the interview:
       receive additional questions and additional preference events associated with the additional questions until a triggering event occurs.

15. The system of claim 14, wherein the triggering event is an expiration of a deadline.

16. The system of claim 14, wherein the triggering event is receipt of a threshold number of questions.

17. The system of claim 14, wherein the triggering event is receipt of a threshold number of preference events.

18. A method, comprising:
    serving a web page identifying a selected interviewee; and
    during an interview with the selected interviewee:
       receiving via the web page a first question directed to the interviewee;
       displaying the first question in the web page;
       receiving from multiple viewers, as they view the web page, a first plurality of preference events associated with the first question;
       calculating, with a processor, a score for the first question based at least in part on the first plurality of preference events; and
       determining, with the processor and based on the calculated score, whether to pose the first question to the interviewee.

19. The method of claim 18, further comprising:
    ranking multiple questions received via the web page, including the first question, based on their controversy;

wherein each of the preference events associated with the first question is one of:
    a positive preference for the first question; and
    a negative preference for the first question; and
wherein the controversy of the first question is different from the calculated score and is inversely proportional to the difference between a total number of positive preferences of the first question and a total number of negative preferences of the first question by the multiple viewers.

20. The method of claim 18, wherein the score comprises a rank.

21. The method of claim 18, wherein at least one preference event is an indication of a positive preference.

22. The method of claim 18, wherein at least one preference event is an indication of a negative preference.

23. The method of claim 18, further comprising, during the interview:
    receiving an indication of a problem associated with the first question.

24. The method of claim 18, wherein the first question is received as text data.

25. The method of claim 18, wherein the first question is received as video data.

26. The method of claim 18, wherein the first question is received as audio data.

27. The method of claim 18, wherein:
    the first question is received from a first web site; and
    the score for the first question is displayed on a second web site.

28. The method of claim 18, wherein:
    the first question is received from a first web site; and
    at least one preference event associated with the first question is received from a second web site.

29. The method of claim 18, wherein at least one preference event is received from a mobile device.

30. The method of claim 18, further comprising, during the interview:
    receiving a second question via the web page;
    displaying the second question in the web page;
    receiving from the multiple viewers, as they view the web page, a second plurality of preference events associated with the second question; and
    ranking the first question and the second question based on the first plurality of preference events and the second plurality of preference events.

31. The method of claim 18, further comprising, during the interview:
    receiving additional questions and additional preference events associated with the additional questions until a triggering event occurs.

32. The method of claim 31, wherein the triggering event is an expiration of a deadline.

33. The method of claim 31, wherein the triggering event is receipt of a threshold number of questions.

34. The method of claim 31, wherein the triggering event is receipt of a threshold number of preference events.

35. A computer program product embodied in a non-transitory computer readable storage medium and comprising computer instructions for:
    serving a web page identifying a selected interviewee; and
    during an interview with the selected interviewee:
        receiving via the web page a first question directed to the interviewee;
        displaying the first question in the web page;
        receiving from multiple viewers, as they view the web page, a first plurality of preference events associated with the first question;
        calculating a score for the first question based at least in part on the first plurality of preference events; and
        determining, based on the calculated score, whether to pose the first question to the interviewee.

* * * * *